United States Patent
Zhang et al.

(10) Patent No.: US 12,432,799 B2
(45) Date of Patent: Sep. 30, 2025

(54) TECHNIQUES FOR DATA TRANSMISSION MANAGEMENT

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/691,349

(22) Filed: Mar. 10, 2022

(65) Prior Publication Data

US 2023/0292383 A1 Sep. 14, 2023

(51) Int. Cl.
| | |
|---|---|
| *H04W 76/15* | (2018.01) |
| *H04W 12/00* | (2021.01) |
| *H04W 28/08* | (2023.01) |
| *H04W 60/04* | (2009.01) |

(52) U.S. Cl.
CPC ......... *H04W 76/15* (2018.02); *H04W 12/009* (2019.01); *H04W 28/0925* (2020.05); *H04W 60/04* (2013.01)

(58) Field of Classification Search
None
See application file for complete search history.

(56) References Cited

U.S. PATENT DOCUMENTS

| 11,425,785 | B2* | 8/2022 | Zhu | H04W 76/16 |
|---|---|---|---|---|
| 2006/0069934 | A1* | 3/2006 | Esch | H04W 52/0274 |
| | | | | 713/300 |
| 2011/0055434 | A1* | 3/2011 | Pyers | G06F 1/3293 |
| | | | | 713/400 |
| 2011/0296006 | A1* | 12/2011 | Krishnaswamy | H04L 67/04 |
| | | | | 709/227 |
| 2012/0213177 | A1* | 8/2012 | Lee | H04W 52/0229 |
| | | | | 370/329 |
| 2016/0360557 | A1* | 12/2016 | Lavi | H04W 76/10 |
| 2017/0083364 | A1* | 3/2017 | Zhao | G06F 9/5083 |
| 2017/0127325 | A1* | 5/2017 | Vikberg | H04W 16/14 |
| 2017/0150470 | A1* | 5/2017 | Kalapatapu | H04W 28/0226 |

(Continued)

*Primary Examiner* — Gregory B Sefcheck
(74) *Attorney, Agent, or Firm* — Dalei Dong; Holland & Hart LLP

(57) ABSTRACT

Methods, systems, and devices for wireless communication are described. A user equipment (UE) may coordinate and improve data flows between wireless communication networks based on messaging between a modem processor and an application processor. In a first example, the modem processor may control the splitting of traffic between a first wireless communication network (e.g., a cellular network) and a second wireless communication network (e.g., a Wi-Fi network). The modem processor may establish a multiple access session (e.g., a multiple access protocol data unit session) that includes a session for each wireless communication network, and route traffic (e.g., communications with a network entity) based on access traffic steering, switching, and splitting (ATSSS) rules. In a second example, the application processor may control the traffic splitting. The application processor may obtain the ATSSS rules from the modem processor, and route traffic accordingly.

28 Claims, 14 Drawing Sheets

(56) References Cited

U.S. PATENT DOCUMENTS

| | | | |
|---|---|---|---|
| 2017/0180550 A1* | 6/2017 | Geo | H04M 7/0042 |
| 2017/0366423 A1* | 12/2017 | Griot | H04L 67/568 |
| 2019/0121417 A1* | 4/2019 | Schneider | H04W 52/0229 |
| 2020/0029382 A1* | 1/2020 | Cullerot | H04W 76/12 |
| 2020/0351716 A1* | 11/2020 | Zu | H04L 5/0044 |
| 2021/0007166 A1* | 1/2021 | Liao | H04W 48/16 |
| 2021/0058936 A1* | 2/2021 | Gordaychik | H04W 72/23 |
| 2021/0092664 A1* | 3/2021 | Lai | H04W 60/04 |
| 2021/0258868 A1* | 8/2021 | Wong | H04W 4/029 |
| 2021/0360506 A1* | 11/2021 | Yang | H04W 40/02 |
| 2022/0038954 A1* | 2/2022 | Ovadia | H04W 28/10 |
| 2022/0086094 A1* | 3/2022 | Amend | H04L 45/24 |
| 2022/0116822 A1* | 4/2022 | Sahin | H04L 45/24 |
| 2022/0166776 A1* | 5/2022 | Lee | H04L 63/0884 |
| 2022/0225438 A1* | 7/2022 | Suh | H04W 76/10 |
| 2022/0264370 A1* | 8/2022 | Qiao | H04W 60/04 |
| 2022/0264679 A1* | 8/2022 | Tamura | H04W 76/15 |
| 2022/0295363 A1* | 9/2022 | Tamura | H04L 12/1407 |
| 2023/0007709 A1* | 1/2023 | Paladugu | H04W 12/03 |
| 2023/0056442 A1* | 2/2023 | Ly | H04W 24/08 |
| 2023/0084094 A1* | 3/2023 | Youn | H04W 36/14 370/331 |
| 2023/0094211 A1* | 3/2023 | Kim | H04W 36/0022 370/331 |
| 2023/0113519 A1* | 4/2023 | Fernandez Alonso | H04W 92/24 370/329 |
| 2023/0132058 A1* | 4/2023 | Youn | H04L 12/14 370/329 |
| 2023/0156466 A1* | 5/2023 | Shu | H04W 12/69 726/2 |
| 2023/0164630 A1* | 5/2023 | Lin | H04W 76/16 370/329 |
| 2023/0171822 A1* | 6/2023 | Yu | H04W 40/02 370/328 |
| 2023/0176995 A1* | 6/2023 | Guan | G06F 13/4221 710/106 |
| 2023/0189368 A1* | 6/2023 | Zhou | H04L 47/24 370/328 |
| 2023/0199560 A1* | 6/2023 | Nuggehalli | H04W 24/10 455/450 |
| 2023/0345221 A1* | 10/2023 | Zhu | H04W 76/15 |
| 2024/0121836 A1* | 4/2024 | Cheng | H04W 76/12 |

* cited by examiner

TECHNIQUES FOR DATA TRANSMISSION MANAGEMENT

FIELD OF TECHNOLOGY

The following relates to wireless communication, including techniques for data transmission management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a UE may communicate concurrently via multiple wireless communications networks. However, for some use cases, conventional aggregation techniques may be deficient or sub-optimal in some current configurations.

SUMMARY

The described techniques relate to improved methods, systems, devices, and apparatuses that support techniques for data transmission management. For example, the described techniques provide for interfaces and call-flows to establish messaging between a modem processor and an application processor of a user equipment (UE) to coordinate and improve data flows between wireless communication networks. In a first example, the modem processor may control the splitting of traffic between a first wireless communication network (e.g., a cellular network) and a second wireless communication network (e.g., a Wi-Fi network). The modem processor may establish a multiple access session (e.g., a multiple access (MA) protocol data unit (PDU) session) that includes a session for each wireless communication network, and route traffic (e.g., communications with a network entity) based on access traffic steering, switching, and splitting (ATSSS) rules. In a second example, the application processor may control the traffic splitting. The application processor may obtain the ATSSS rules from the modem processor, and route traffic accordingly.

A method for wireless communication at a user equipment (UE) is described. The method may include indicating, to an application processor and from a modem processor associated with a first wireless communication network, a readiness state for communication via a second wireless communication network based on a route selection policy at the UE, obtaining, at the modem processor and based on the indicated readiness state, a request to establish a connection with the second wireless communication network, indicating, to the application processor and in response to the obtained request, a set of data transmission rules associated with the first wireless communication network and the second wireless communication network, and communicating with a network entity via a multiple access session in accordance with the indicated set of data transmission rules, the multiple access session including a first access session associated with communication via the first wireless communication network and a second access session associated with the communication via the second wireless communication network.

An apparatus for wireless communication at a UE is described. The apparatus may include a processor, memory coupled with the processor, and instructions stored in the memory. The instructions may be executable by the processor to cause the apparatus to indicate, to an application processor and from a modem processor associated with a first wireless communication network, a readiness state for communication via a second wireless communication network based on a route selection policy at the UE, obtain, at the modem processor and based on the indicated readiness state, a request to establish a connection with the second wireless communication network, indicate, to the application processor and in response to the obtained request, a set of data transmission rules associated with the first wireless communication network and the second wireless communication network, and communicate with a network entity via a multiple access session in accordance with the indicated set of data transmission rules, the multiple access session including a first access session associated with communication via the first wireless communication network and a second access session associated with the communication via the second wireless communication network.

Another apparatus for wireless communication at a UE is described. The apparatus may include means for indicating, to an application processor and from a modem processor associated with a first wireless communication network, a readiness state for communication via a second wireless communication network based on a route selection policy at the UE, means for obtaining, at the modem processor and based on the indicated readiness state, a request to establish a connection with the second wireless communication network, means for indicating, to the application processor and in response to the obtained request, a set of data transmission rules associated with the first wireless communication network and the second wireless communication network, and means for communicating with a network entity via a multiple access session in accordance with the indicated set of data transmission rules, the multiple access session including a first access session associated with communication via the first wireless communication network and a second access session associated with the communication via the second wireless communication network.

A non-transitory computer-readable medium storing code for wireless communication at a UE is described. The code may include instructions executable by a processor to indicate, to an application processor and from a modem processor associated with a first wireless communication network, a readiness state for communication via a second wireless communication network based on a route selection policy at the UE, obtain, at the modem processor and based on the indicated readiness state, a request to establish a connection with the second wireless communication network, indicate, to the application processor and in response to the obtained request, a set of data transmission rules associated with the first wireless communication network and the second wireless communication network, and communicate with a network entity via a multiple access session in accordance with the indicated set of data transmission rules, the multiple access session including a first access session associated with communication via the first wireless communication network and a second access session associated with the communication via the second wireless communication network.

Some examples of the method, apparatuses, and non-transitory computer-readable medium described herein may further include operations, features, means, or instructions for indicating, from the modem processor to the application processor, a connection status based on the obtained request to establish the connection with the second wireless communication network, obtaining, from the application processor and in response to the indicated connection status, a configuration request associated with a security protocol at the modem processor, and indicating a security configuration to the application processor in response to the obtained configuration request, where the communicating with the network entity may be based on the indicated security configuration.

Some examples of the method, apparatuses, and non-transitory computer-readable medium described herein may further include operations, features, means, or instructions for indicating, from a first layer of the modem processor to a second layer of the modem processor, a service associated with the second wireless communication network and obtaining, in response to the indicated service, a registration request associated with a non-access stratum of the first wireless communication network.

In some examples of the method, apparatuses, and non-transitory computer-readable medium described herein, the indicated readiness state includes an identifier associated with the UE, a payload of the obtained registration request, or both.

Some examples of the method, apparatuses, and non-transitory computer-readable medium described herein may further include operations, features, means, or instructions for indicating the multiple access session to the application processor, where the request to establish the connection with the second wireless communication network may be obtained in response to the indicated multiple access session.

Some examples of the method, apparatuses, and non-transitory computer-readable medium described herein may further include operations, features, means, or instructions for obtaining, from the application processor, a configuration request based on the obtained request to establish the connection with the second wireless communication network, the obtained configuration request including one or more internet protocol addresses associated with the second wireless communication network and indicating, from the modem processor to the application processor, a connection status in response to the obtained configuration request.

Some examples of the method, apparatuses, and non-transitory computer-readable medium described herein may further include operations, features, means, or instructions for obtaining, at the modem processor, an indication of the second wireless communication network, where the readiness state may be indicated based on the obtained indication.

In some examples of the method, apparatuses, and non-transitory computer-readable medium described herein, the indication of the second wireless communication network may be obtained from the application processor.

In some examples of the method, apparatuses, and non-transitory computer-readable medium described herein, the obtained request indicates the connection with the second wireless communication network may be secondary to a connection with the first wireless communication network.

In some examples of the method, apparatuses, and non-transitory computer-readable medium described herein, the indicated set of data transmission rules include one or more rules associated with access traffic steering, switching, splitting, or any combination thereof.

In some examples of the method, apparatuses, and non-transitory computer-readable medium described herein, the indicated set of data transmission rules may be associated with a multipath transmission control protocol.

A method for wireless communication at a UE is described. The method may include obtaining, at an application processor and from a modem processor associated with a first wireless communication network, an indication of a readiness state for communication via a second wireless communication network based on a route selection policy at the UE, indicating, to the modem processor and based on the obtained indication of the readiness state, a request to establish a connection with the second wireless communication network, obtaining, at the application processor and from the modem processor, a set of data transmission rules associated with the first wireless communication network and the second wireless communication network, and communicating with a network entity via a multiple access session in accordance with the indicated set of data transmission rules, the multiple access session including a first access session associated with communication via the first wireless communication network and a second access session associated with the communication via the second wireless communication network.

An apparatus for wireless communication at a UE is described. The apparatus may include a processor, memory coupled with the processor, and instructions stored in the memory. The instructions may be executable by the processor to cause the apparatus to obtain, at an application processor and from a modem processor associated with a first wireless communication network, an indication of a readiness state for communication via a second wireless communication network based on a route selection policy at the UE, indicate, to the modem processor and based on the obtained indication of the readiness state, a request to establish a connection with the second wireless communication network, obtain, at the application processor and from the modem processor, a set of data transmission rules associated with the first wireless communication network and the second wireless communication network, and communicate with a network entity via a multiple access session in accordance with the indicated set of data transmission rules, the multiple access session including a first access session associated with communication via the first wireless communication network and a second access session associated with the communication via the second wireless communication network.

Another apparatus for wireless communication at a UE is described. The apparatus may include means for obtaining, at an application processor and from a modem processor associated with a first wireless communication network, an indication of a readiness state for communication via a second wireless communication network based on a route selection policy at the UE, means for indicating, to the modem processor and based on the obtained indication of the readiness state, a request to establish a connection with the second wireless communication network, means for obtaining, at the application processor and from the modem processor, a set of data transmission rules associated with the first wireless communication network and the second wireless communication network, and means for communicating with a network entity via a multiple access session in accordance with the indicated set of data transmission rules, the multiple access session including a first access session associated with communication via the first wireless communication network and a second access session associated with the communication via the second wireless communication network.

A non-transitory computer-readable medium storing code for wireless communication at a UE is described. The code may include instructions executable by a processor to obtain, at an application processor and from a modem processor associated with a first wireless communication network, an indication of a readiness state for communication via a second wireless communication network based on a route selection policy at the UE, indicate, to the modem processor and based on the obtained indication of the readiness state, a request to establish a connection with the second wireless communication network, obtain, at the application processor and from the modem processor, a set of data transmission rules associated with the first wireless communication network and the second wireless communication network, and communicate with a network entity via a multiple access session in accordance with the indicated set of data transmission rules, the multiple access session including a first access session associated with communication via the first wireless communication network and a second access session associated with the communication via the second wireless communication network.

Some examples of the method, apparatuses, and non-transitory computer-readable medium described herein may further include operations, features, means, or instructions for obtaining, from the modem processor, a connection status based on the indicated request to establish the connection with the second wireless communication network, indicating, in response to the indicated connection status, a configuration request associated with a security protocol at the modem processor, and obtaining a security configuration in response to the indicated configuration request, where the communicating with the network entity may be based on the obtained security configuration.

Some examples of the method, apparatuses, and non-transitory computer-readable medium described herein may further include operations, features, means, or instructions for indicating the second wireless network to the modem processor, where the indication of the readiness state may be obtained in response to indicating the second wireless network.

In some examples of the method, apparatuses, and non-transitory computer-readable medium described herein, the obtained indication of the readiness state includes an identifier associated with the UE, a payload of a registration request associated with a non-access stratum of the first wireless communication network, or both.

Some examples of the method, apparatuses, and non-transitory computer-readable medium described herein may further include operations, features, means, or instructions for obtaining, from the modem processor, an indication of the multiple access session, where the request to establish the connection with the second wireless communication network may be indicated in response to the obtained indication of the multiple access session.

Some examples of the method, apparatuses, and non-transitory computer-readable medium described herein may further include operations, features, means, or instructions for indicating, to the modem processor, a configuration request based on the indicated request to establish the connection with the second wireless communication network, the indicated configuration request including one or more internet protocol addresses associated with the second wireless communication network and obtaining, from the modem processor, a connection status in response to the indicated configuration request.

Some examples of the method, apparatuses, and non-transitory computer-readable medium described herein may further include operations, features, means, or instructions for obtaining, at the application processor, an indication of the second wireless communication network, where the request to establish the connection with the second wireless communication network may be indicated based on the obtained indication of the second wireless network.

In some examples of the method, apparatuses, and non-transitory computer-readable medium described herein, the request to establish the connection with the second wireless communication network indicates the connection with the second wireless communication network may be secondary to a connection with the first wireless communication network.

In some examples of the method, apparatuses, and non-transitory computer-readable medium described herein, the obtained set of data transmission rules include one or more rules associated with access traffic steering, switching, splitting, or any combination thereof.

In some examples of the method, apparatuses, and non-transitory computer-readable medium described herein, the obtained set of data transmission rules may be associated with a multipath transmission control protocol.

DETAILED DESCRIPTION

In some cases, a user equipment (UE) may access a core network (e.g., a fifth generation (5G) core (5GC)) via multiple wireless communication networks concurrently according to access traffic steering, switching, and splitting (ATSSS) rules, where a ratio of traffic on each wireless communication network may be based on the ATSSS rules and other parameters, including load balancing, network coverage, etc. Some wireless communication networks, such as a New Radio (NR) cellular network, may operate based on a set of protocols associated with the core network, while others, such as a Wi-Fi network, may operate based on other protocols. For UEs communicating according to ATSSS rules, it may be beneficial to improve coordination between a modem processor and an application processor, where the modem processor may control communication via the cellular network (e.g., by controlling a cellular modem) and the application processor may control communications via the Wi-Fi network (e.g., by controlling a wireless modem).

The techniques described herein may include interfaces and call-flows to establish messaging between a modem processor and an application processor of a UE to coordinate and improve data flows between wireless communication networks. In a first example, the modem processor may control the splitting of traffic (e.g., communications with a network entity) between a first wireless communication network (e.g., a cellular network) and a second wireless communication network (e.g., a Wi-Fi network). The modem processor may establish a multiple access session (e.g., a multiple access protocol data unit (PDU) session) that includes a session for each wireless communication network, and route traffic based on ATSSS rules. In a second example, the application processor may control the traffic splitting. The application processor may obtain the ATSSS rules from the modem processor, and route traffic accordingly.

Aspects of the disclosure are initially described in the context of wireless communications systems. Aspects of the disclosure are further illustrated by and described with reference to component diagrams, process flows, apparatus diagrams, system diagrams, and flowcharts that relate to techniques for data transmission management.

Figure 1:
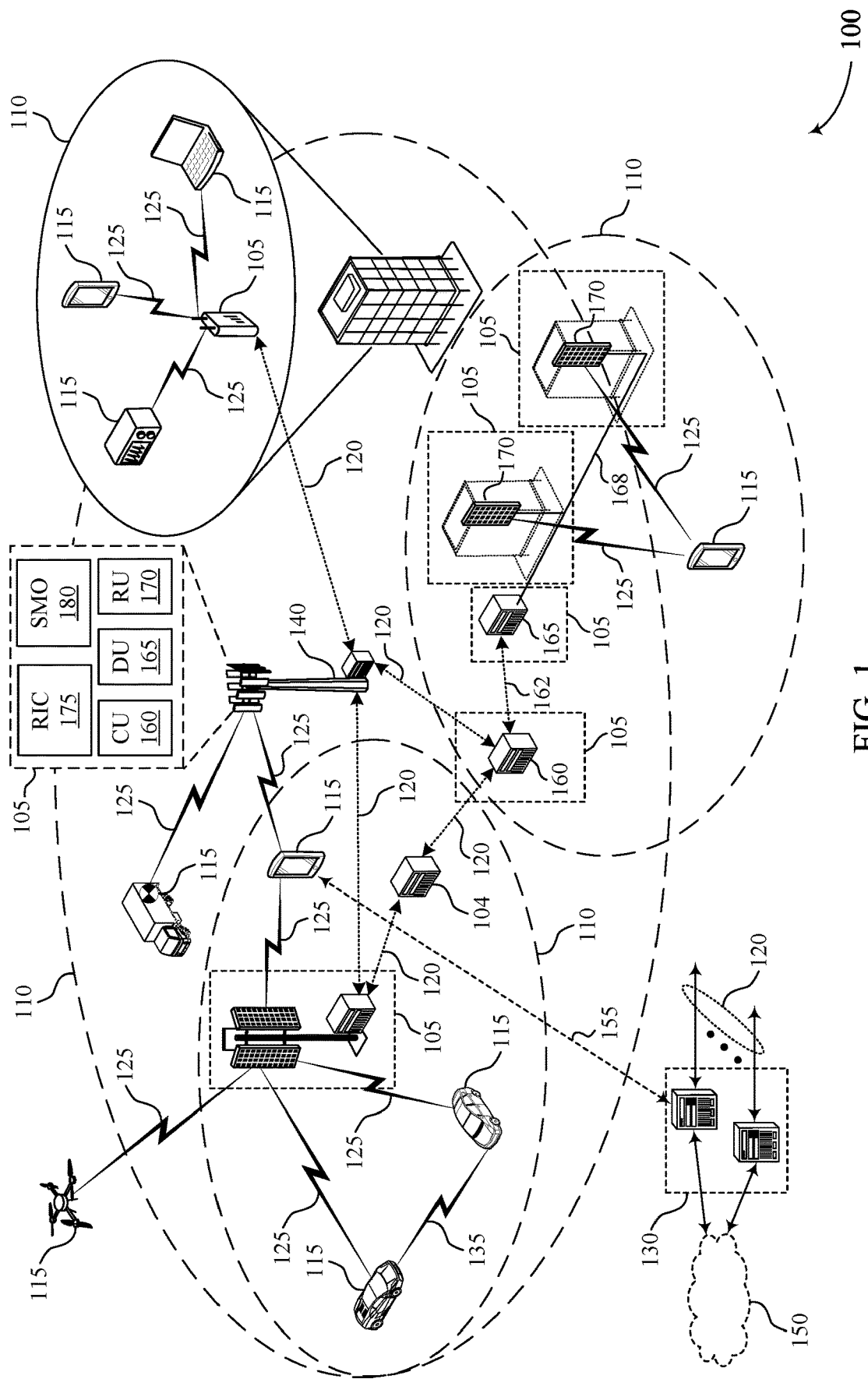
FIG. 1 illustrates an example of a wireless communications system that supports techniques for data transmission management in accordance with one or more aspects of the present disclosure.

FIG. 1 illustrates an example of a wireless communications system 100 that supports techniques for data transmission management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for data transmission management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5GC, which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

As described herein, a UE 115 may coordinate and improve data flows between wireless communication networks in a multiple access session (e.g., a multiple access PDU session) based on messaging between a modem processor and an application processor. In a first example, the modem processor may control the splitting of traffic (e.g., communications with a network entity) between a first wireless communication network (e.g., a cellular network) and a second wireless communication network (e.g., a Wi-Fi network). The modem processor may establish a multiple access session that includes a session for each wireless communication network, and route traffic (e.g., communications with a network entity 105) based on ATSSS rules. In a second example, the application processor may control the traffic splitting. The application processor may obtain the ATSSS rules from the modem processor, and route traffic accordingly.

Figure 2:
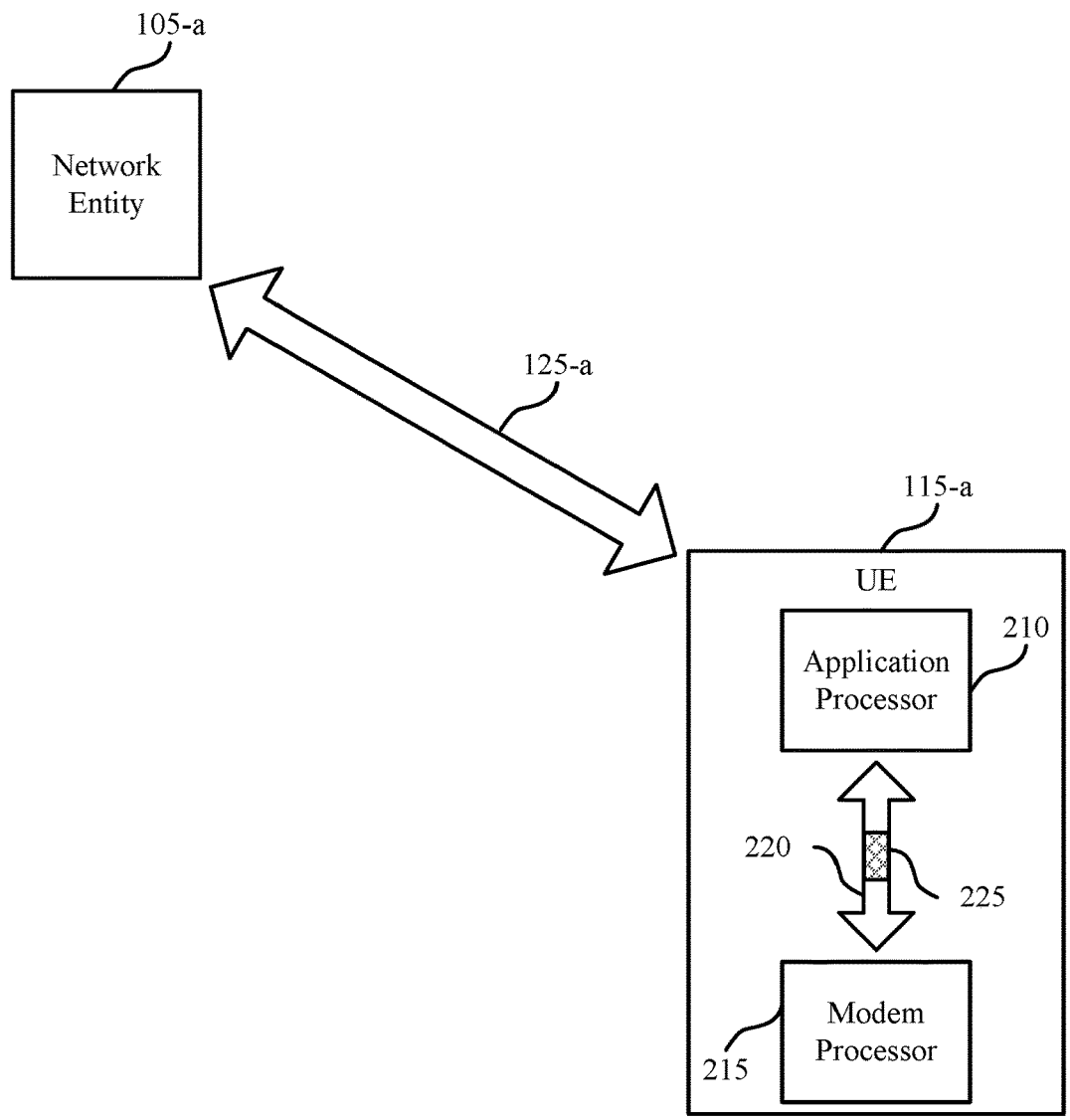
FIG. 2 illustrates an example of a wireless communications system that supports techniques for data transmission management in accordance with one or more aspects of the present disclosure.

FIG. 2 illustrates an example of a wireless communications system 200 that supports techniques for data transmission management in accordance with one or more aspects of the present disclosure. The wireless communications system 200 may implement or be implemented by aspects of the wireless communications system 100 as described with reference to FIG. 1. For example, the wireless communications system 200 may include a network entity 105-a and a UE 115-a, which may be examples of corresponding devices described with reference to FIG. 1. The wireless communications system 200 may support improvements to communications reliability and load balancing, among other benefits.

The UE 115-a may communicate with the network entity 105-a via a communication link 125-a, such as in a multiple access PDU session. For example, the UE 115-a may communicate via a first wireless communication network (e.g., an NR cellular network) using a cellular modem controlled by a modem processor 215 and via a second wireless communication network (e.g., a Wi-Fi network) using a wireless modem controlled by an application processor 210. The modem processor 215 may control the cellular modem according to a first set of communication protocols (e.g., a set of protocols defined according to a 3rd Generation Partnership Project (3GPP) standard, including a non-access stratum (NAS) protocol set, an RRC protocol set, a Layer 1 (L1) protocol, a Layer 2 (L2) protocol, a Layer 3 (L3) protocol, or any combination thereof), and the application processor 210 may control the wireless modem according to a second set of communication protocols (e.g., a set of protocols defined according to an Internet Engineering Task Force (IETF) standard, such as an Internet protocol suite including a Transmission Control Protocol (TCP), an IP, a TCP/IP protocol stack, or any combination thereof).

As described herein, the UE 115-a may communicate with the network entity 105-a via the first and second wireless communication networks concurrently according to a set of data transmission rules 225 (e.g., ATSSS rules) to improve communications via the communication link 125-a. In a first example, the modem processor 215 may control a splitting of traffic (e.g., communications with the network entity 105-a) between the first wireless communication network and the second wireless communication network. The modem processor 215 may establish a multiple access session (e.g., the multiple access protocol data unit (PDU) session) that includes a session for each wireless communication network on the communication link 125-a, and route traffic based on the data transmission rules 225. In a second example, the application processor 210 may control the traffic splitting. The application processor 210 may obtain the data transmission rules 225 from the modem processor 215 via an interface 220, and route traffic accordingly. In some examples, the application processor 210 may route the traffic using a multipath TCP (MPTCP) component.

Figure 3:
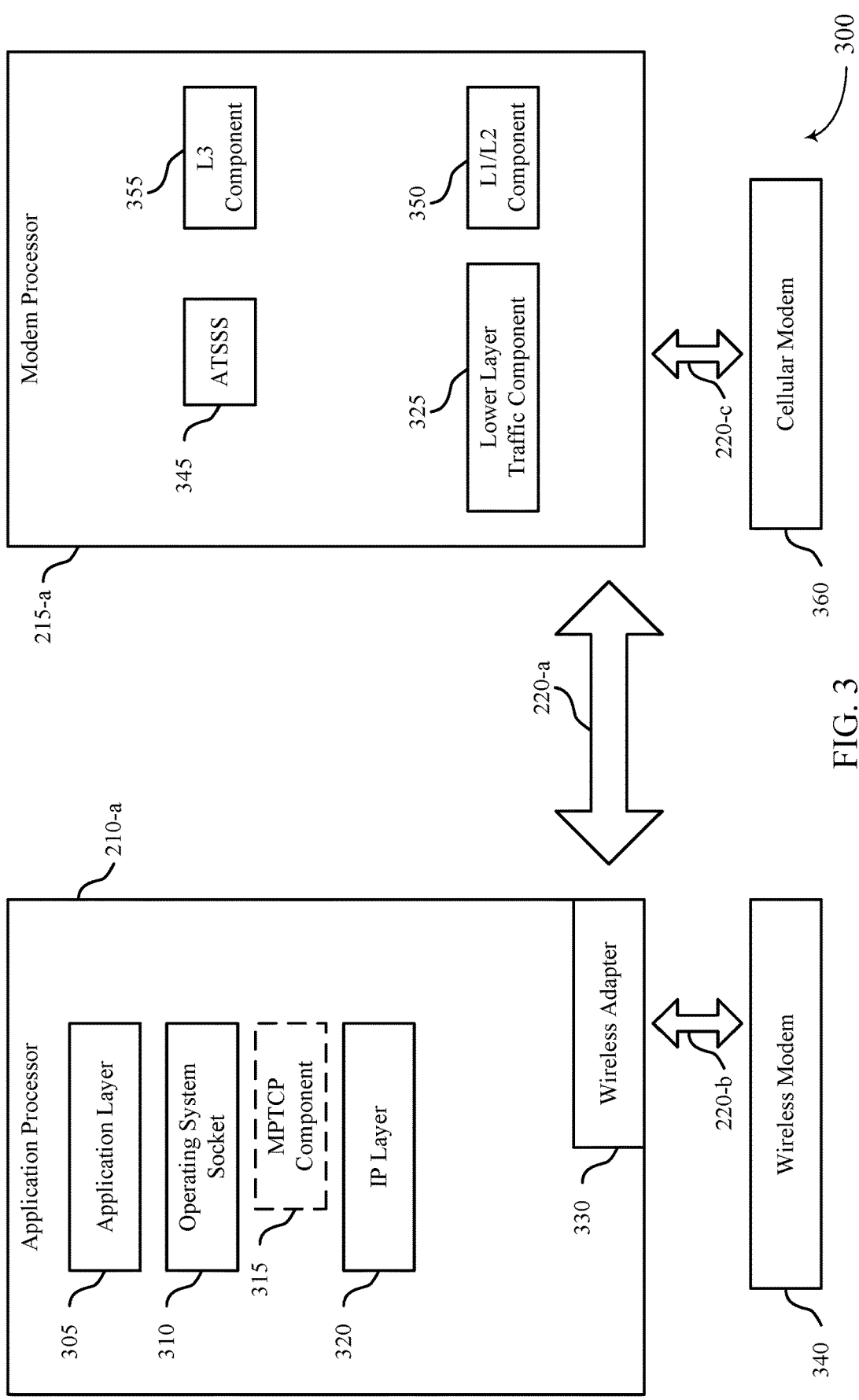
FIGS. 3 and 4 illustrates examples of component diagrams that support techniques for data transmission management in accordance with one or more aspects of the present disclosure.

FIG. 3 illustrates an example of a component diagram 300 that supports techniques for data transmission management in accordance with one or more aspects of the present disclosure. The component diagram 300 may include components of one or more wireless devices, such as a network entity and a UE, which may be examples of a network entity 105 and a UE 115 as described with reference to FIG. 1. For example, the component diagram 300 may include an application processor 210-a, a modem processor 215-a, one or more interfaces 220, a wireless modem 340, and a cellular modem 360, which may be examples of components at a UE. The component diagram 300 may support improvements to communications reliability and load balancing at the UE, among other benefits.

As illustrated in FIG. 3, the UE may communicate via a first wireless communication network (e.g., an NR cellular network) using the cellular modem 360 controlled by the modem processor 215-a and via a second wireless communication network (e.g., a Wi-Fi network) using the wireless modem 340 controlled by the application processor 210-a. Data from an application layer 305 (e.g., an application at the UE) may be routed by an operating system socket 310 to an IP layer 320. In some examples, the IP layer 320 may include a TCP stack, a user datagram protocol (UDP) stack, or both. The IP layer 320 may route the data to the modem processor 215 via a wireless adapter 330 and an interface 220-a. In some examples, the wireless adapter 330 may include a wireless wide area network (WWAN) adapter, a wireless local area network (WLAN) adapter, or both.

The modem processor 215-*a* may control a splitting of traffic (e.g., communications with a network entity) between the first wireless communication network and the second wireless communication network according to a set of data transmission rules (e.g., ATSSS rules). For example, a lower layer traffic component 325 (which in some cases may be referred to as an ATSSS-LL) at the modem processor 215-*a* may split the traffic based on load balancing, a coverage parameter, or both. The lower layer traffic component 325 may obtain the data transmission rules from an ATSSS component 345. In some examples, the UE may receive the data transmission rules from a network entity via an L3 component 355. The lower layer traffic component 325 may route a first ratio of the data for transmission using the cellular modem 360 via an L1/L2 component 350 and an interface 220-*c*, and route a second ratio of the data for transmission using the wireless modem 360 via the interface 220-*a*, the wireless adapter 330, and an interface 220-*b*. For example, the lower layer traffic component 325 may route X % of the data for transmission using the cellular modem 360, and route 1-X % of the data for transmission using the wireless modem 340.

In some examples, an MPTCP component 315 may route a first portion of the data to the modem processor 215-*a* for transmission using the cellular modem 360 and route a second portion of the data for transmission using the wireless modem 340. The modem processor 215-*a* may indicate the data transmission rules associated with the MPTCP component 315 to the application processor 210-*a* via the interface 220-*a*.

Figure 4:
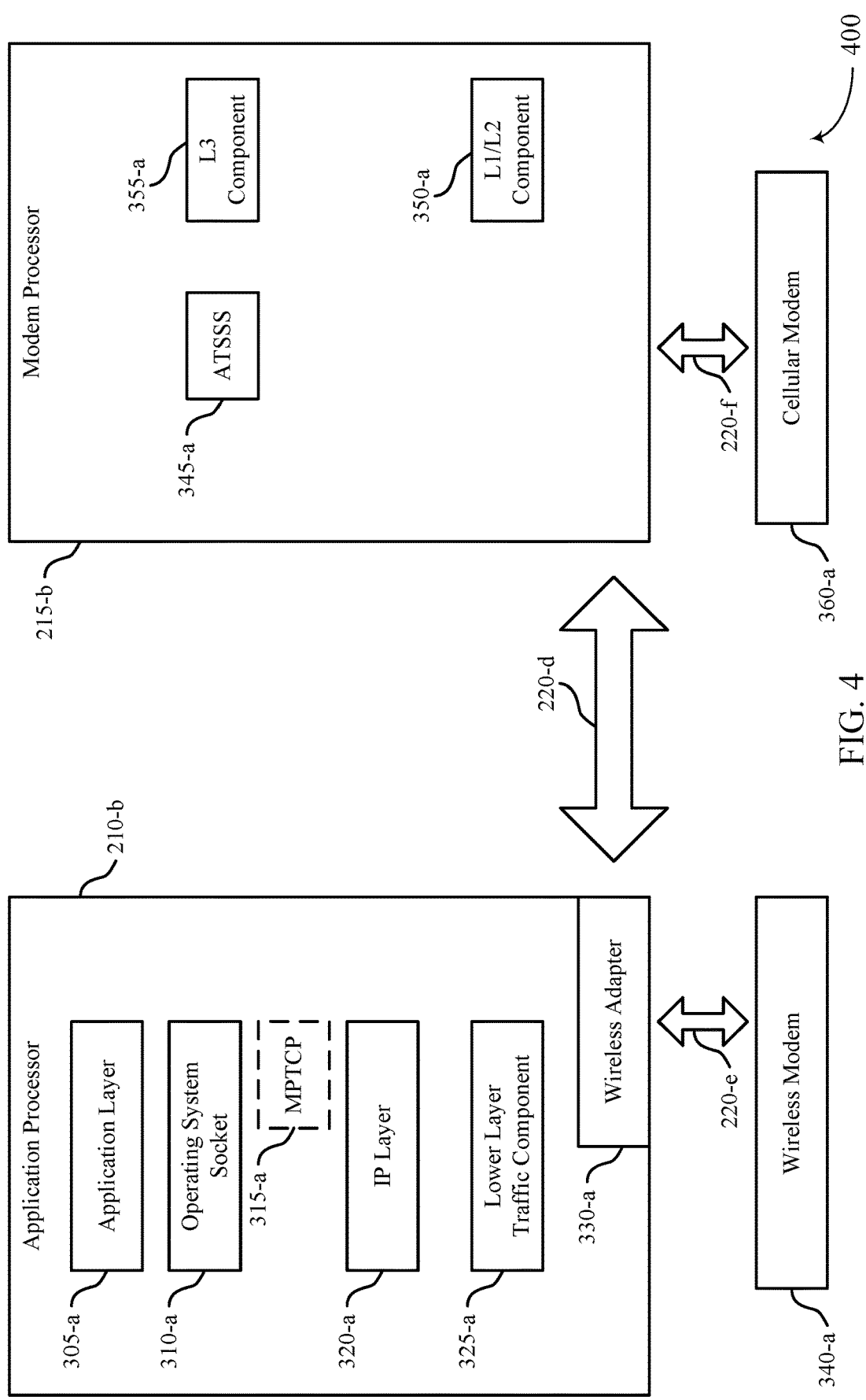

FIG. 4 illustrates an example of a component diagram 400 that supports techniques for data transmission management in accordance with one or more aspects of the present disclosure. The component diagram 400 may include components of one or more wireless devices, such as a network entity and a UE, which may be examples of a network entity 105 and a UE 115 as described with reference to FIG. 1. For example, the component diagram 400 may include an application processor 210-*b*, a modem processor 215-*b*, one or more interfaces 220, a wireless modem 340-*a*, and a cellular modem 360-*a*, which may be examples of components at a UE. The component diagram 400 may support improvements to communications reliability and load balancing at the UE, among other benefits.

As illustrated in FIG. 4, the UE may communicate via a first wireless communication network (e.g., an NR cellular network) using the cellular modem 360-*a* controlled by the modem processor 215-*b* and via a second wireless communication network (e.g., a Wi-Fi network) using the wireless modem 340-*a* controlled by the application processor 210-*b*. Data from an application layer 305-*a* (e.g., an application at the UE) may be routed by an operating system socket 310-*a* to an IP layer 320-*a*. In some examples, the IP layer 320-*a* may include a TCP stack, a UDP stack, or both.

The application processor 210-*a* may control a splitting of traffic (e.g., communications with a network entity) between the first wireless communication network and the second wireless communication network according to a set of data transmission rules (e.g., ATSSS rules). The IP layer 320-*a* may route the data to a lower layer traffic component 325-*a*, where the lower layer traffic component 325-*a* may split the traffic based on load balancing, a coverage parameter, or both. The lower layer traffic component 325-*a* may obtain the data transmission rules from an ATSSS component 345-*a* at the modem process 215-*b* via an interface 220-*d*. In some examples, the UE may receive the data transmission rules from a network entity via an L3 component 355-*a*. The lower layer traffic component 325-*a* may route a first ratio of the data for transmission using the cellular modem 360-*a* via a wireless adapter 330-*a*, the interface 220-*d*, an L1/L2 component 350-*a*, and an interface 220-*f*. In some examples, the wireless adapter 330-*a* may include a WWAN adapter, a WLAN adapter, or both. The lower layer component 325-*a* may further route a second ratio of the data for transmission using the wireless modem 360-*a* via the wireless adapter 330-*a* and an interface 220-*e*. For example, the lower layer traffic component 325-*a* may route X % of the data for transmission using the cellular modem 360-*a*, and route 1-X % of the data for transmission using the wireless modem 340-*a*.

In some examples, an MPTCP component 315-*a* may route a first portion of the data to the modem processor 215-*b* for transmission using the cellular modem 360-*a* and route a second portion of the data for transmission using the wireless modem 340-*a*. The modem processor 215-*b* may indicate the data transmission rules associated with the MPTCP component 315-*a* to the application processor 210-*b* via the interface 220-*d*.

Figure 5:
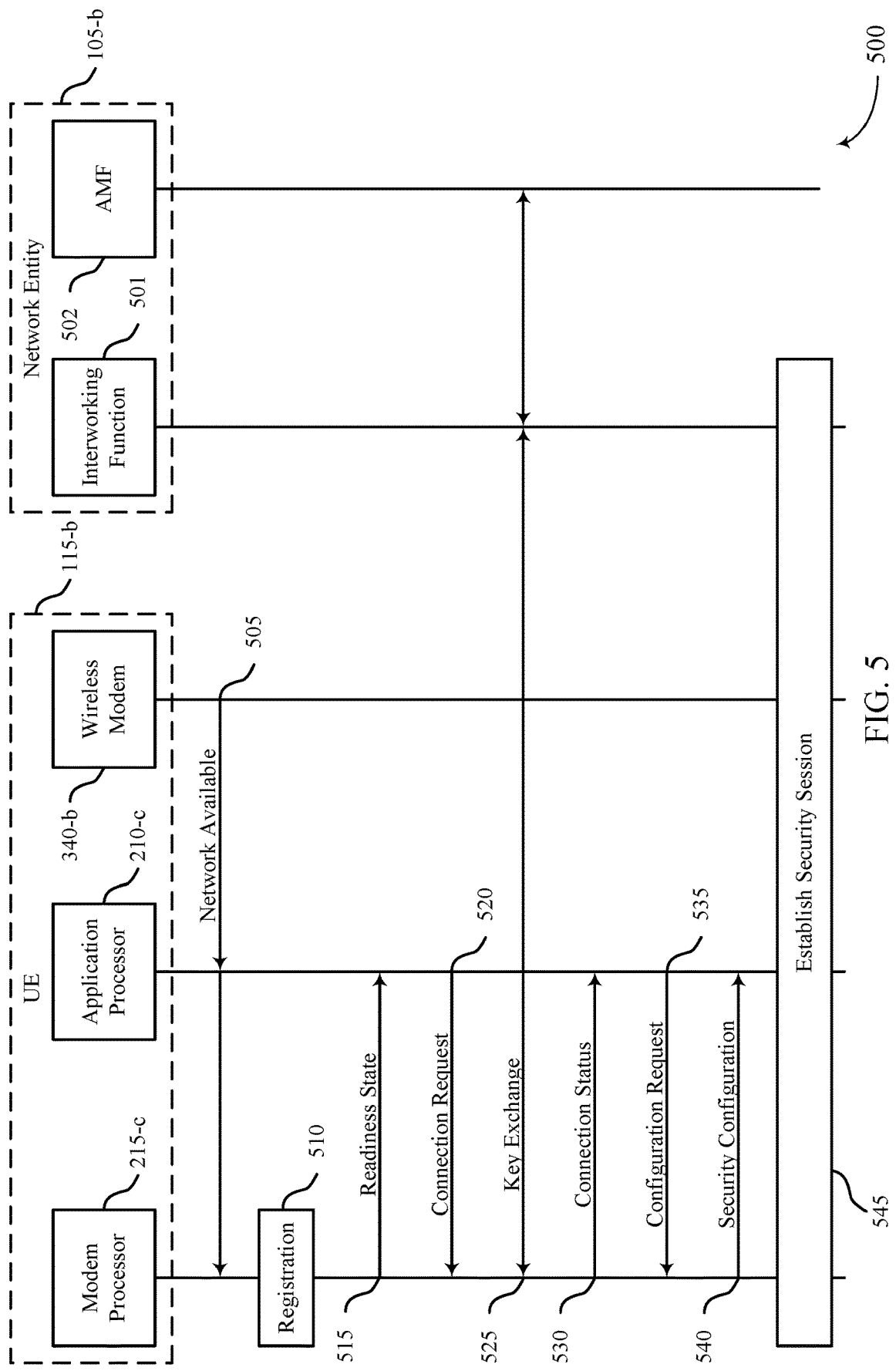
FIG. 5 through 8 illustrate examples of process flows that support techniques for data transmission management in accordance with one or more aspects of the present disclosure.

FIG. 5 illustrates an example of a process flow 500 that supports techniques for data transmission management in accordance with one or more aspects of the present disclosure. In some examples, the process flow 500 may implement aspects of the wireless communications systems 100 and 200. For example, the process flow 500 may include example operations associated with one or more components of a UE 115-*b* or a network entity 105-*b*, each of which may be examples of corresponding devices described with reference to FIGS. 1 and 2. In the following description of the process flow 500, the operations between the components may be performed in a different order than the example order shown, or the operations performed by the components may be performed in different orders or at different times. Some operations may also be omitted from the process flow 500, and other operations may be added to the process flow 500.

The process flow 500 may illustrate messaging enabling a modem processor 215-*c* to control a splitting of traffic (e.g., communications with the network entity 105-*b*) between a first wireless communication network (e.g., an NR cellular network) using a cellular modem controlled by the modem processor 215-*c* and a second wireless network (e.g., a Wi-Fi network) using a wireless modem 340-*b* controlled by an application processor 210-*c*. The operations performed by the components may support improvement to data transmission operations at the devices and, in some examples, may promote improvements to efficiency and reliability for communications between the devices, among other benefits.

At 505, the modem processor 215-*c* and the application processor 210-*c* may obtain (e.g., from the wireless modem 340-*b*) an indication that the second wireless communication network is available. Based on the indication, the modem processor 215-*c* may determine whether to use the second wireless communication network for data transmission, for example based on a UE resource selection policy (URSP) at the UE 115-*b*. If the modem processor 215-*c* determines to use the second wireless communication network, the modem processor 215-*c* may select an interworking function 501 at the network entity 105-*b* to use for communicating via the first and second wireless communication networks concurrently.

At 510, the modem processor 215-*c* may indicate a service associated with the second wireless communication network to an NAS layer associated with the first wireless communication network, and obtain a registration request associated with the NAS layer.

At 515, the modem processor 215-*c* may indicate to the application processor 210-*c* a readiness state for communication via the second wireless communication network. In some examples, the indication may be referred to as QMI_WDS_NON_3GPP_SIGNALLING_SETUP_IND, which may indicate to an operating system at the application processor 210-*c* that the cellular modem is ready for a signaling setup for the second wireless communication network.

At 520, the application processor 210-*c* may indicate to the modem processor 215-*c* a request to establish a connection with the second wireless communication network. In some examples, the indication may be referred to as QMI_WDS_START_NW_INTERFACE, which may be used to request a network connection. In some examples, the indication may include a parameter that indicates the request is for a secondary access for a previous network request (e.g., a request associated with the first wireless communication network). In some examples, based on the request, the modem processor 215-*c* may indicate to the application processor 210-*c* that a reverse IP transport connection status (e.g., a status associated with a proxy connection) has been changed, where the indication may be referred to as QMI_WDS_REVERSE_IP_TRANSPORT_CONNECTION_IND.

At 525, the modem processor 215-*c* may perform a key exchange (e.g., an Internet key exchange (IKE)) operation with the interworking function 501 (and, in some cases, with an AMF 502) associated with a security parameter for communicating with the network entity 105-*b*. Based on the key exchange operation, the modem processor 215-*c* may configure an IP address assigned to an interface associated with the second wireless communication network.

At 530, the modem processor 215-*c* may indicate to the application processor 210-*c* a connection status associated with the second wireless communication network. For example, the indication may include a reverse IP transport connection status (e.g., a status associated with the second wireless communication network) has been changed, where the indication may be referred to as QMI_WDS_REVERSE_IP_TRANSPORT_CONNECTION_IND.

At 535, the application processor 210-*c* may indicate to the modem processor 215-*c* a configuration request associated with a security protocol (e.g., an IP security (IPsec) security association) at the modem processor 215-*c*. For example, the application processor 210-*c* may query the modem processor 215-*c* for one or more IPsec security association configurations, where the indication may be referred to as QMI_WDS_GET_IPSEC_STATIC_SA_CONFIG_REQ.

At 540, the modem processor 215-*c* may indicate to the application processor 210-*c* a security configuration in response to the configuration request. In some examples, the indication may be referred to as QMI_WDS_GET_IPSEC_STATIC_SA_CONFIG_RESP, where the indication may include an encryption key, an encryption method, a local address, an inner address, or any combination thereof. In some examples, in response to obtaining the security configuration, the application processor 210-*c* may indicate to the modem processor 215-*c* a request to complete a reverse IP transport configuring operation, where the request may be referred to as QMI_WDS_REVERSE_IP_TRANSPORT_CONFIG_COMPLETE_REQ. In some examples, in response to the request, the modem processor 215-*c* may indicate to the application processor that the reverse IP transport configuration operation is complete, where the indication may be referred to as QMI_WDS_REVERSE_IP_TRANSPORT_CONFIG_COMPLETE_RESP.

At 545, the UE 115-*b* and the network entity 105-*b* may establish a security session for communicating via the first wireless communication network and the second wireless communication network.

Figure 6:
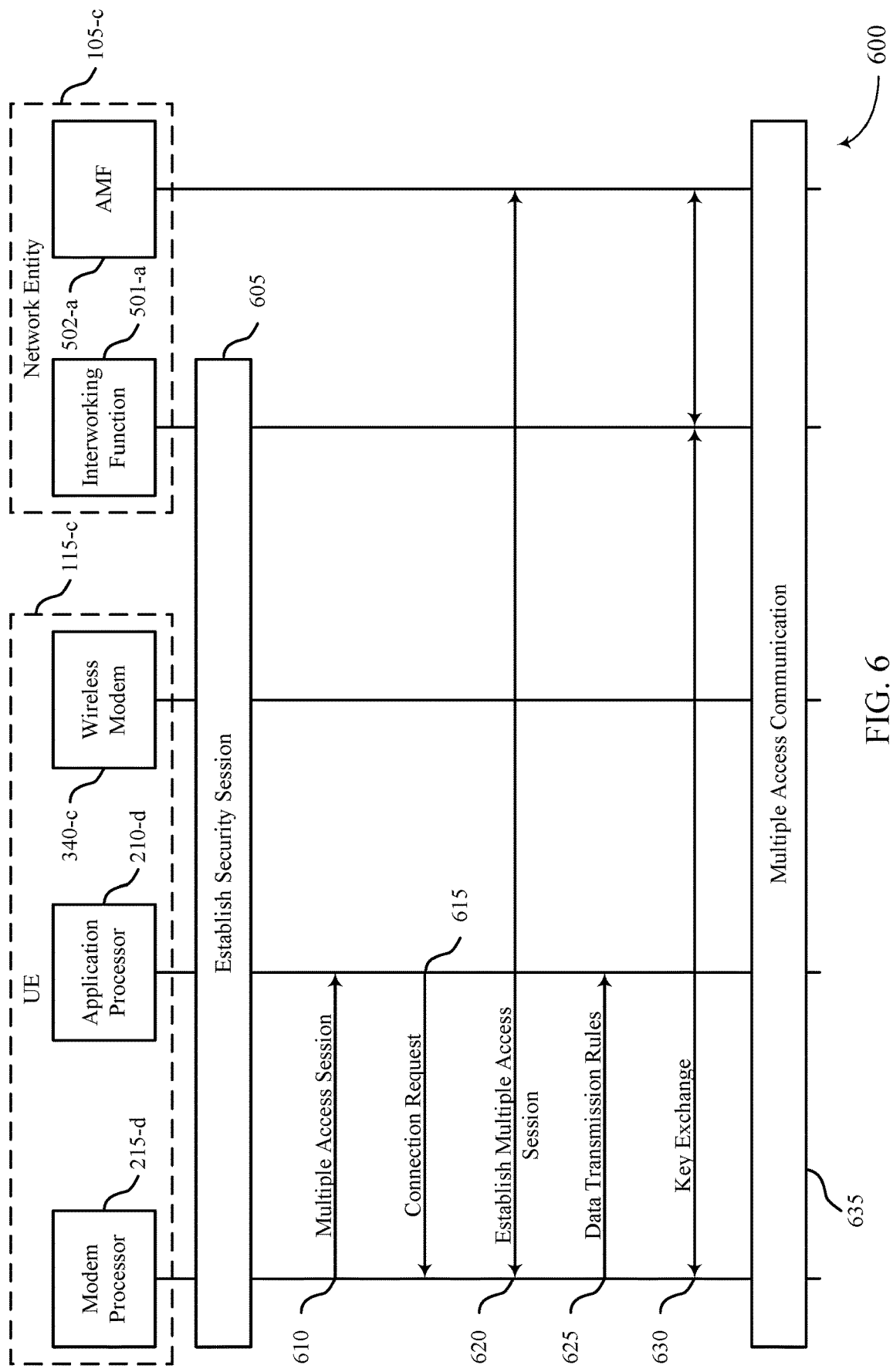

FIG. 6 illustrates an example of a process flow 600 that supports techniques for data transmission management in accordance with one or more aspects of the present disclosure. In some examples, the process flow 600 may implement aspects of the wireless communications systems 100 and 200. For example, the process flow 600 may include example operations associated with one or more components of a UE 115-*c* or a network entity 105-*c*, each of which may be examples of corresponding devices described with reference to FIGS. 1 and 2. In the following description of the process flow 600, the operations between the components may be performed in a different order than the example order shown, or the operations performed by the components may be performed in different orders or at different times. Some operations may also be omitted from the process flow 600, and other operations may be added to the process flow 600.

The process flow 600 may illustrate messaging enabling a modem processor 215-*d* to control a splitting of traffic (e.g., communications with the network entity 105-*c*) between a first wireless communication network (e.g., an NR cellular network) using a cellular modem controlled by the modem processor 215-*d* and a second wireless network (e.g., a Wi-Fi network) using a wireless modem 340-*c* controlled by an application processor 210-*d*. The operations performed by the components may support improvement to data transmission operations at the devices and, in some examples, may promote improvements to efficiency and reliability for communications between the devices, among other benefits.

At 605, the UE 115-*c* and the network entity 105-*c* may establish a security session for communicating via the first wireless communication network and the second wireless communication network as described with reference to FIG. 5. Based on establishing the security session, the application processor 210-*d* may indicate to the modem processor 215-*d* a request to establish a connection with the second wireless communication network. In some examples, the indication may be referred to as QMI_WDS_START_NW_INTERFACE, which may be used to request a network connection (e.g., for Internet communications). In some examples, the indication may include a parameter that indicates the request is for a secondary access for a previous network request (e.g., a request associated with the first wireless communication network). The modem processor 215-*d* may determine whether a multiple access session (e.g., a multiple access PDU session) is permitted for the network connection based on a URSP at the UE 115-*c*.

At 610, the modem processor 215-*d* may indicate the multiple access session to the application processor 210-*d*, for example based on determining the multiple access session is permitted. In some examples, the indication may be referred to as QMI_WDS_MA_PDU_NETWORK_AVAIL_IND and may indicate that a multiple access PDU route is selected for communication with the network entity 105-*c*.

At 615, the application processor 210-*d* may indicate a connection request to the modem processor 215-*d*. In some examples, the indication may be referred to as QMI_WDS_START_NW_INTERFACE, which may be used to request one or more network connections (e.g., for Internet communications via the multiple access PDU session).

At 620, the modem processor 215-d may communicate with an AMF 502-a to establish the multiple access session. For example, the modem processor 215-d may indicate a PDU session establishment request, which may indicate the PDU session is a multiple access PDU session. The AMF 502-a may indicate that the request is accepted, and the multiple access session may be established.

At 625, the modem processor 215-d may indicate a set of data transmission rules (e.g., ATSSS rules) to the application processor 210-d. The set of data transmission rules may provide the application processor 210-d with rules for traffic associated with an MPTCP component.

At 630, the modem processor 215-d may perform a key exchange (e.g., an IKE) operation with a interworking function 501-a (and, in some cases, with the AMF 502-a) associated with communicating via the second wireless communication network. Based on the key exchange operation, the modem processor 215-c may establish a security association for the second wireless communication network.

At 635, the UE 115-c may communicate with the network entity 105-c via the first and second wireless communication networks in the multiple access session according to the techniques described herein. For example, the modem processor 215-d may control a splitting of traffic between the first wireless communication network and the second wireless communication network according to the data transmission rules. The operations described herein may support improvements to communications reliability and load balancing at the UE 115-c, among other benefits.

Figure 7:
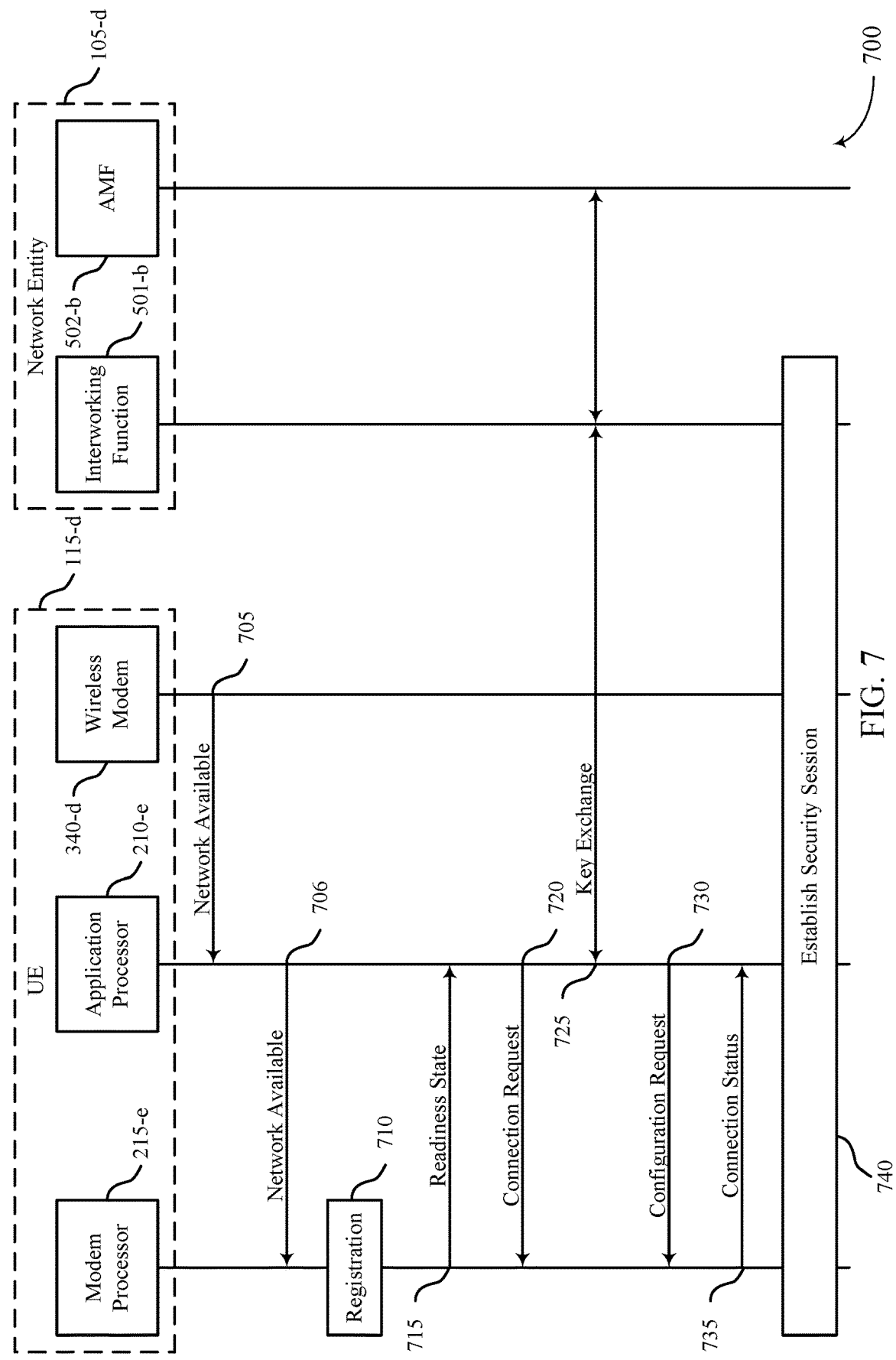

FIG. 7 illustrates an example of a process flow 700 that supports techniques for data transmission management in accordance with one or more aspects of the present disclosure. In some examples, the process flow 700 may implement aspects of the wireless communications systems 100 and 200. For example, the process flow 700 may include example operations associated with one or more components of a UE 115-d or a network entity 105-d, each of which may be examples of corresponding devices described with reference to FIGS. 1 and 2. In the following description of the process flow 700, the operations between the components may be performed in a different order than the example order shown, or the operations performed by the components may be performed in different orders or at different times. Some operations may also be omitted from the process flow 700, and other operations may be added to the process flow 700.

The process flow 700 may illustrate messaging enabling an application processor 210-e to control a splitting of traffic (e.g., communications with the network entity 105-d) between a first wireless communication network (e.g., an NR cellular network) using a cellular modem controlled by a modem processor 215-e and a second wireless network (e.g., a Wi-Fi network) using a wireless modem 340-d controlled by the application processor 210-e. The operations performed by the components may support improvement to data transmission operations at the devices and, in some examples, may promote improvements to efficiency and reliability for communications between the devices, among other benefits.

At 705, the application processor 210-e may obtain (e.g., from the wireless modem 340-b) an indication that the second wireless communication network is available. Based on the indication, the application processor 210-e may determine whether to use the second wireless communication network for data transmission, for example based on a URSP at the UE 115-d. If the application processor 210-e determines to use the second wireless communication network, the application processor 210-e may select an interworking function 501-b at the network entity 105-d to use for communicating via the first and second wireless communication networks concurrently.

At 706, the application processor 210-e may indicate to the modem processor that the second wireless communication network is available. In some examples, the indication may be referred to as QMI_WDS_NON_3GPP_SIGNALLING_SETUP_REQ, and may indicate to the modem processor that a non-3GPP service (e.g., via the Wi-Fi network) is requested at the application processor 210-e.

At 710, the modem processor 215-e may indicate a service associated with the second wireless communication network to an NAS layer associated with the first wireless communication network, and obtain a registration request associated with the NAS layer.

At 715, the modem processor 215-e may indicate to the application processor 210-e a readiness state for communication via the second wireless communication network. In some examples, the indication may be referred to as QMI_WDS_NON_3GPP_SIGNALLING_SETUP_IND, which may indicate to an operating system at the application processor 210-e that the cellular modem is ready for a signaling setup for the second wireless communication network. In some examples, the indication may include an identifier associated with the UE 115-d, an NAS payload associated with the registration request, or both.

At 720, the application processor 210-e may indicate to the modem processor 215-e a request to establish a connection with the second wireless communication network. In some examples, the indication may be referred to as QMI_WDS_START_NW_INTERFACE, which may be used to request a network connection. In some examples, the indication may include a parameter that indicates the request is for a secondary access for a previous network request (e.g., a request associated with the first wireless communication network).

At 725, the application processor 210-e may perform a key exchange (e.g., an IKE) operation with the interworking function 501-b (and, in some cases, with an AMF 502-b) associated with a security parameter for communicating with the network entity 105-d. Based on the key exchange operation, the application processor 210-e may configure an IP address assigned to an interface associated with the second wireless communication network.

At 730, the application processor 210-e may indicate to the modem processor 215-e a configuration request. For example, the indication may configure the modem processor 215-e with one or more IP addresses for non-3GPP NAS signaling, where the indication may be referred to as QMI_WDS_NON_3GPP_SIGNALLING_CONFIG_REQ. In some examples, the indication may include the one or more IP addresses (e.g., IPv4 addresses, IPV6 addresses, or any combination thereof), one or more NAS destination IP addresses (e.g., IPv4 addresses, IPV6 addresses, or any combination thereof), an NAS TCP port, or any combination thereof.

At 735, the modem processor 215-e may indicate to the application processor 210-e a connection status associated with the second wireless communication network. For example, the indication may include a reverse IP transport connection status (e.g., a status associated with the second wireless communication network) has been changed, where the indication may be referred to as QMI_WDS_REVERSE_IP_TRANSPORT_CONNECTION_IND.

At 740, the UE 115-d and the network entity 105-d may establish a security session for communicating via the first wireless communication network and the second wireless communication network.

Figure 8:
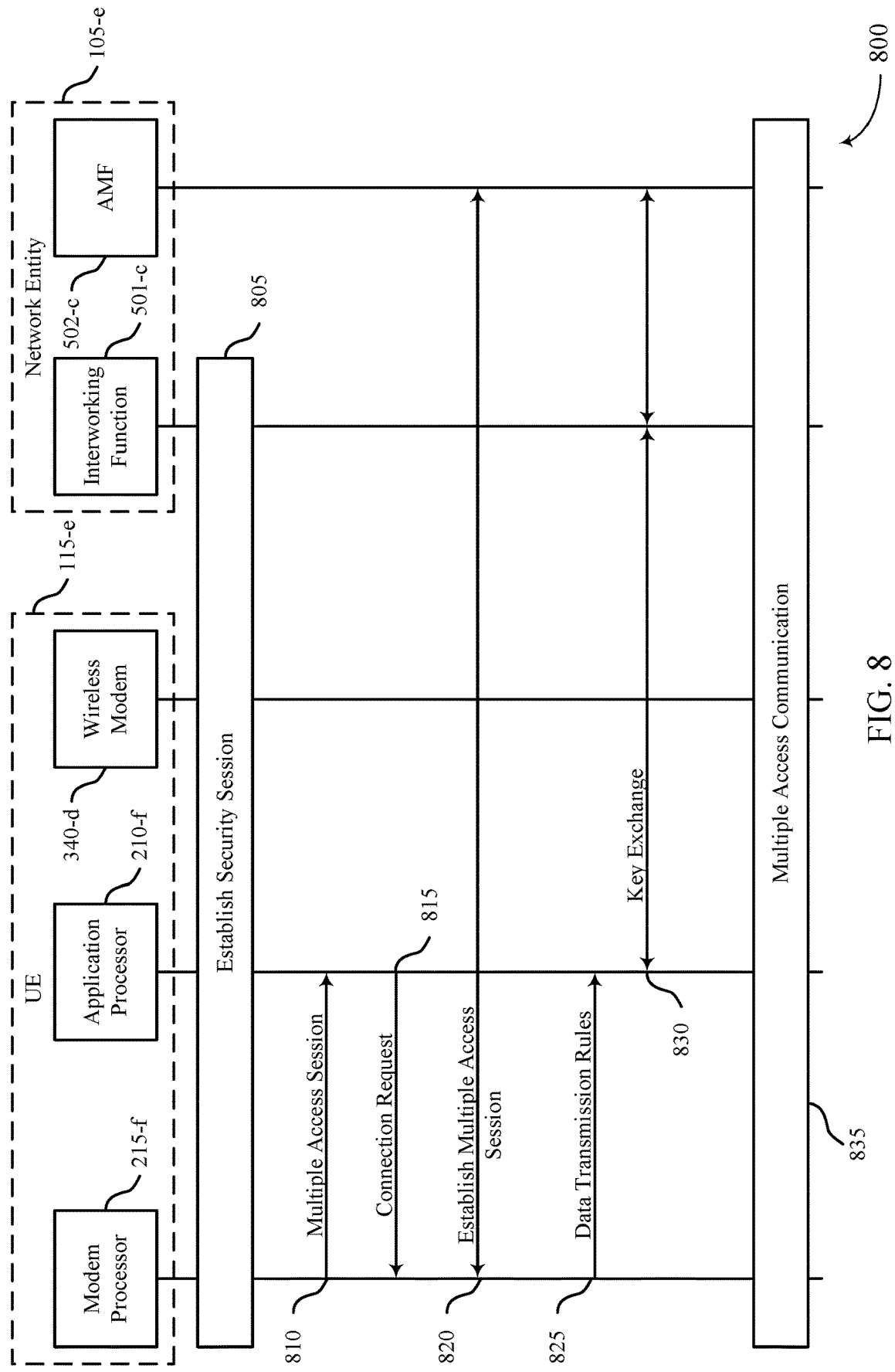

FIG. 8 illustrates an example of a process flow 800 that supports techniques for data transmission management in accordance with one or more aspects of the present disclosure. In some examples, the process flow 800 may implement aspects of the wireless communications systems 100 and 200. For example, the process flow 800 may include example operations associated with one or more components of a UE 115-e or a network entity 105-e, each of which may be examples of corresponding devices described with reference to FIGS. 1 and 2. In the following description of the process flow 800, the operations between the components may be performed in a different order than the example order shown, or the operations performed by the components may be performed in different orders or at different times. Some operations may also be omitted from the process flow 800, and other operations may be added to the process flow 800.

The process flow 800 may illustrate messaging enabling an application processor 210-f to control a splitting of traffic (e.g., communications with the network entity 105-e) between a first wireless communication network (e.g., an NR cellular network) using a cellular modem controlled by a modem processor 215-f and a second wireless network (e.g., a Wi-Fi network) using a wireless modem 340-e controlled by the application processor 210-f. The operations performed by the components may support improvement to data transmission operations at the devices and, in some examples, may promote improvements to efficiency and reliability for communications between the devices, among other benefits.

At 805, the UE 115-e and the network entity 105-e may establish a security session for communicating via the first wireless communication network and the second wireless communication network as described with reference to FIG. 7. Based on establishing the security session, the application processor 210-f may indicate to the modem processor 215-f a request to establish a connection with the second wireless communication network. In some examples, the indication may be referred to as QMI_WDS_START_NW_INTERFACE, which may be used to request a network connection (e.g., for Internet communications). In some examples, the indication may include a parameter that indicates the request is for a secondary access for a previous network request (e.g., a request associated with the first wireless communication network). The modem processor 215-f may determine whether a multiple access session (e.g., a multiple access PDU session) is permitted for the network connection based on a URSP at the UE 115-e.

At 810, the modem processor 215-f may indicate the multiple access session to the application processor 210-f, for example based on determining the multiple access session is permitted. In some examples, the indication may be referred to as QMI_WDS_MA_PDU_NETWORK_AVAIL_IND and may indicate that a multiple access PDU route is selected for communication with the network entity 105-e.

At 815, the application processor 210-f may indicate a connection request to the modem processor 215-f. In some examples, the indication may be referred to as QMI_WDS_START_NW_INTERFACE, which may be used to request one or more network connections (e.g., for Internet communications via the multiple access PDU session).

At 820, the modem processor 215-f may communicate with an AMF 502-a to establish the multiple access session. For example, the modem processor 215-f may indicate a PDU session establishment request, which may indicate the PDU session is a multiple access PDU session. The AMF 502-c may indicate that the request is accepted, and the multiple access session may be established.

At 825, the modem processor 215-f may indicate a set of data transmission rules (e.g., ATSSS rules) to the application processor 210-f. In some examples, the modem processor 215-f may obtain the set of data transmission rules from the network entity 105-e.

At 830, the application processor 210-f may perform a key exchange (e.g., an IKE) operation with a interworking function 501-c (and, in some cases, with the AMF 502-c) associated with communicating via the second wireless communication network. Based on the key exchange operation, the application processor 210-f may establish a security association for the second wireless communication network.

At 835, the UE 115-e may communicate with the network entity 105-e via the first and second wireless communication networks in the multiple access session according to the techniques described herein. For example, the application process 210-f may control a splitting of traffic between the first wireless communication network and the second wireless communication network according to the data transmission rules. The operations described herein may support improvements to communications reliability and load balancing at the UE 115-e, among other benefits.

Figure 9:
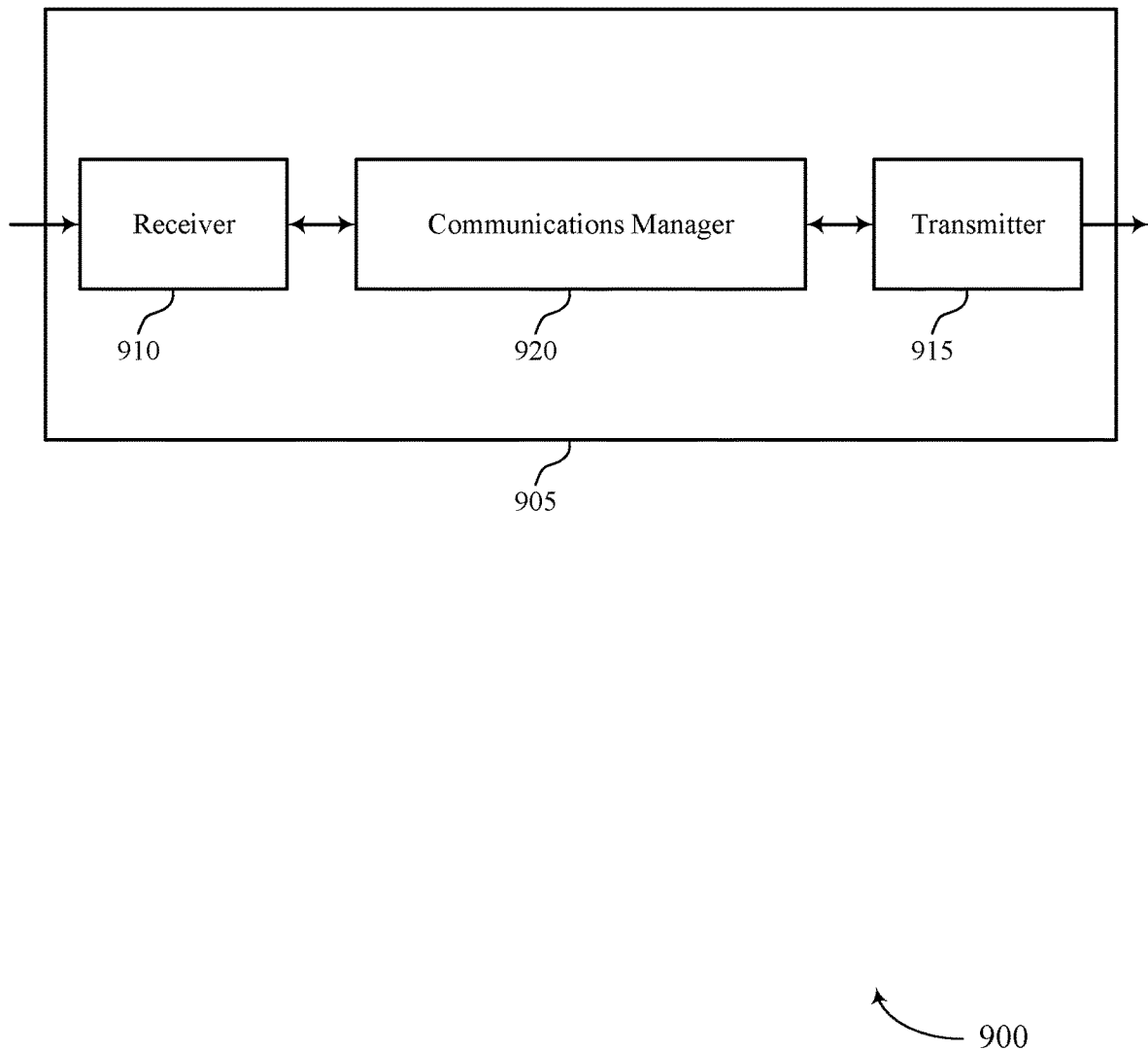
FIGS. 9 and 10 show block diagrams of devices that support techniques for data transmission management in accordance with one or more aspects of the present disclosure.

FIG. 9 shows a block diagram 900 of a device 905 that supports techniques for data transmission management in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for data transmission management). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for data transmission management). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for data transmission management as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for indicating, to an application processor and from a modem processor associated with a first wireless communication network, a readiness state for communication via a second wireless communication network based on a route selection policy at the UE. The communications manager 920 may be configured as or otherwise support a means for obtaining, at the modem processor and based on the indicated readiness state, a request to establish a connection with the second wireless communication network. The communications manager 920 may be configured as or otherwise support a means for indicating, to the application processor and in response to the obtained request, a set of data transmission rules associated with the first wireless communication network and the second wireless communication network. The communications manager 920 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

Additionally, or alternatively, the communications manager 920 may support wireless communication at a UE in accordance with examples as disclosed herein. For example, the communications manager 920 may be configured as or otherwise support a means for obtaining, at an application processor and from a modem processor associated with a first wireless communication network, an indication of a readiness state for communication via a second wireless communication network based on a route selection policy at the UE. The communications manager 920 may be configured as or otherwise support a means for indicating, to the modem processor and based on the obtained indication of the readiness state, a request to establish a connection with the second wireless communication network. The communications manager 920 may be configured as or otherwise support a means for obtaining, at the application processor and from the modem processor, a set of data transmission rules associated with the first wireless communication network and the second wireless communication network. The communications manager 920 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, more efficient utilization of communication resources, and improved load balancing, among other benefits.

Figure 10:
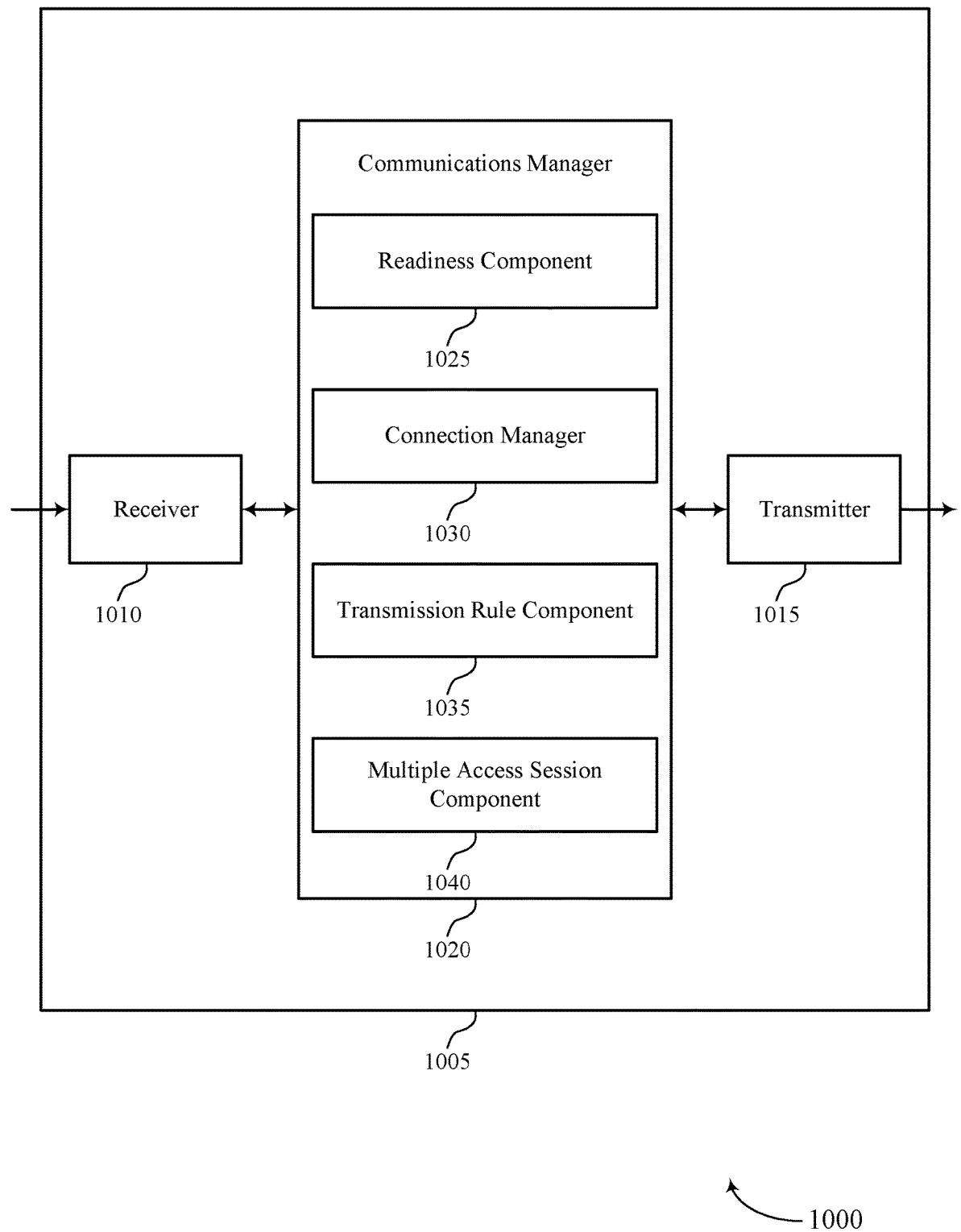

FIG. 10 shows a block diagram 1000 of a device 1005 that supports techniques for data transmission management in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for data transmission management). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for data transmission management). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for data transmission management as described herein. For example, the communications manager 1020 may include a readiness component 1025, a connection manager 1030, a transmission rule component 1035, a multiple access session component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The readiness component 1025 may be configured as or otherwise support a means for indicating, to an application processor and from a modem processor associated with a first wireless communication network, a readiness state for communication via a second wireless communication network based on a route selection policy at the UE. The connection manager 1030 may be configured as or otherwise support a means for obtaining, at the modem processor and based on the indicated readiness state, a request to establish a connection with the second wireless communication network. The transmission rule component 1035 may be configured as or otherwise support a means for indicating, to the application processor and in response to the obtained request, a set of data transmission rules associated with the first wireless communication network and the second wireless communication network. The multiple access session component 1040 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

Additionally, or alternatively, the communications manager 1020 may support wireless communication at a UE in accordance with examples as disclosed herein. The readiness component 1025 may be configured as or otherwise support a means for obtaining, at an application processor and from a modem processor associated with a first wireless communication network, an indication of a readiness state for communication via a second wireless communication network based on a route selection policy at the UE. The connection manager 1030 may be configured as or otherwise support a means for indicating, to the modem processor and based on the obtained indication of the readiness state, a request to establish a connection with the second wireless communication network. The transmission rule component 1035 may be configured as or otherwise support a means for obtaining, at the application processor and from the modem processor, a set of data transmission rules associated with the first wireless communication network and the second wireless communication network. The multiple access session component 1040 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

Figure 11:
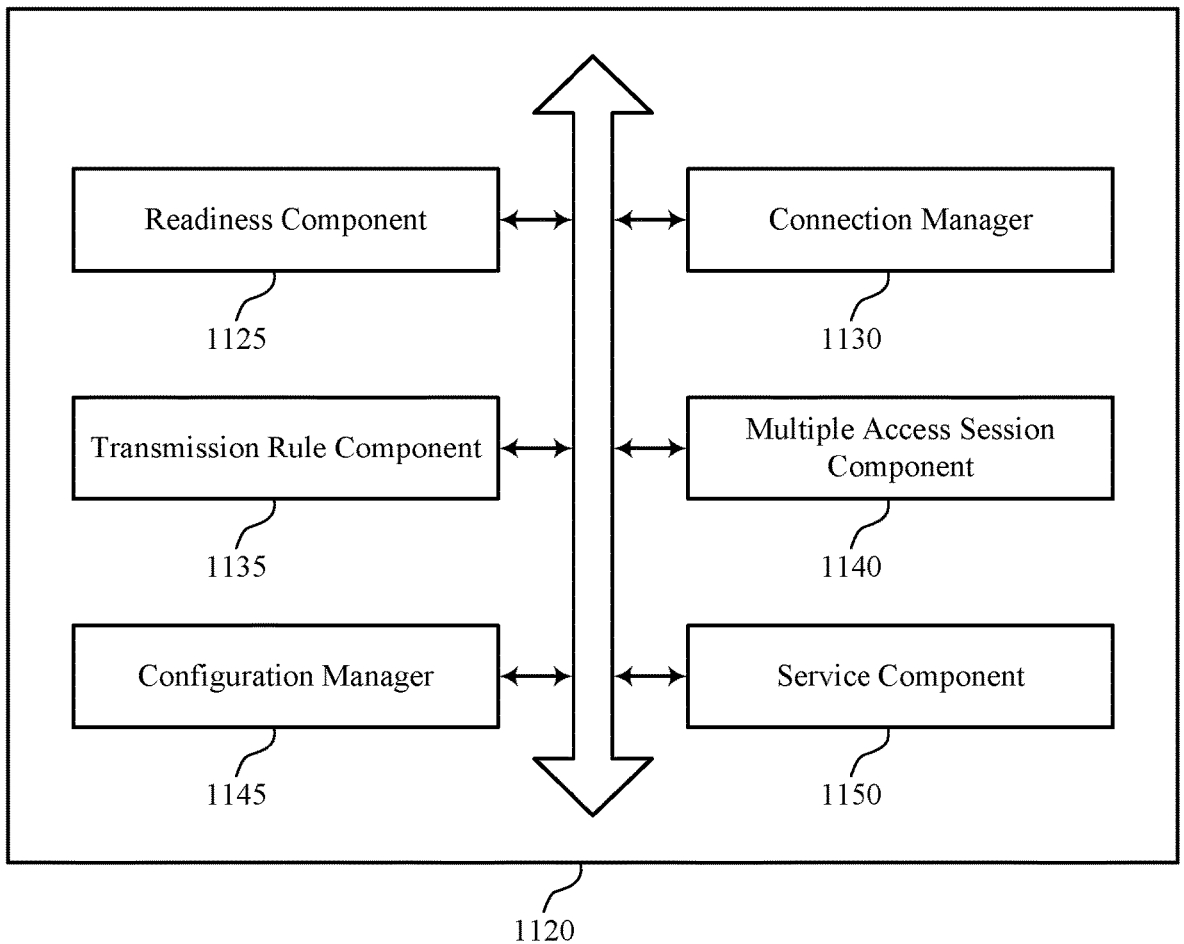
FIG. 11 shows a block diagram of a communications manager that supports techniques for data transmission management in accordance with one or more aspects of the present disclosure.

FIG. 11 shows a block diagram 1100 of a communications manager 1120 that supports techniques for data transmission management in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for data transmission management as described herein. For example, the communications manager 1120 may include a readiness component 1125, a connection manager 1130, a transmission rule component 1135, a multiple access session component 1140, a configuration manager 1145, a service component 1150, or any combination thereof. Each of these components may communicate, directly or indirectly, with one another (e.g., via one or more buses).

The communications manager 1120 may support wireless communication at a UE in accordance with examples as disclosed herein. The readiness component 1125 may be configured as or otherwise support a means for indicating, to an application processor and from a modem processor associated with a first wireless communication network, a readiness state for communication via a second wireless communication network based on a route selection policy at the UE. The connection manager 1130 may be configured as or otherwise support a means for obtaining, at the modem processor and based on the indicated readiness state, a request to establish a connection with the second wireless communication network. The transmission rule component 1135 may be configured as or otherwise support a means for indicating, to the application processor and in response to the obtained request, a set of data transmission rules associated with the first wireless communication network and the second wireless communication network. The multiple access session component 1140 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

In some examples, the connection manager 1130 may be configured as or otherwise support a means for indicating, from the modem processor to the application processor, a connection status based on the obtained request to establish the connection with the second wireless communication network. In some examples, the configuration manager 1145 may be configured as or otherwise support a means for obtaining, from the application processor and in response to the indicated connection status, a configuration request associated with a security protocol at the modem processor. In some examples, the configuration manager 1145 may be configured as or otherwise support a means for indicating a security configuration to the application processor in response to the obtained configuration request, where the communicating with the network entity is based on the indicated security configuration.

In some examples, the service component 1150 may be configured as or otherwise support a means for indicating, from a first layer of the modem processor to a second layer of the modem processor, a service associated with the second wireless communication network. In some examples, the service component 1150 may be configured as or otherwise support a means for obtaining, in response to the indicated service, a registration request associated with a non-access stratum of the first wireless communication network.

In some examples, the indicated readiness state includes an identifier associated with the UE, a payload of the obtained registration request, or both.

In some examples, the multiple access session component 1140 may be configured as or otherwise support a means for indicating the multiple access session to the application processor, where the request to establish the connection with the second wireless communication network is obtained in response to the indicated multiple access session.

In some examples, the configuration manager 1145 may be configured as or otherwise support a means for obtaining, from the application processor, a configuration request based on the obtained request to establish the connection with the second wireless communication network, the obtained configuration request including one or more internet protocol addresses associated with the second wireless communication network. In some examples, the connection manager 1130 may be configured as or otherwise support a means for indicating, from the modem processor to the application processor, a connection status in response to the obtained configuration request.

In some examples, the connection manager 1130 may be configured as or otherwise support a means for obtaining, at the modem processor, an indication of the second wireless communication network, where the readiness state is indicated based on the obtained indication.

In some examples, the indication of the second wireless communication network is obtained from the application processor.

In some examples, the obtained request indicates the connection with the second wireless communication network is secondary to a connection with the first wireless communication network.

In some examples, the indicated set of data transmission rules include one or more rules associated with access traffic steering, switching, splitting, or any combination thereof.

In some examples, the indicated set of data transmission rules are associated with a multipath transmission control protocol.

Additionally, or alternatively, the communications manager 1120 may support wireless communication at a UE in accordance with examples as disclosed herein. In some examples, the readiness component 1125 may be configured as or otherwise support a means for obtaining, at an application processor and from a modem processor associated with a first wireless communication network, an indication of a readiness state for communication via a second wireless communication network based on a route selection policy at the UE. In some examples, the connection manager 1130 may be configured as or otherwise support a means for indicating, to the modem processor and based on the obtained indication of the readiness state, a request to establish a connection with the second wireless communication network. In some examples, the transmission rule component 1135 may be configured as or otherwise support a means for obtaining, at the application processor and from the modem processor, a set of data transmission rules associated with the first wireless communication network and the second wireless communication network. In some examples, the multiple access session component 1140 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

In some examples, the connection manager 1130 may be configured as or otherwise support a means for obtaining, from the modem processor, a connection status based on the indicated request to establish the connection with the second wireless communication network. In some examples, the configuration manager 1145 may be configured as or otherwise support a means for indicating, in response to the indicated connection status, a configuration request associated with a security protocol at the modem processor. In some examples, the configuration manager 1145 may be configured as or otherwise support a means for obtaining a security configuration in response to the indicated configuration request, where the communicating with the network entity is based on the obtained security configuration.

In some examples, the connection manager 1130 may be configured as or otherwise support a means for indicating the second wireless network to the modem processor, where the indication of the readiness state is obtained in response to indicating the second wireless network.

In some examples, the obtained indication of the readiness state includes an identifier associated with the UE, a payload of a registration request associated with a non-access stratum of the first wireless communication network, or both.

In some examples, the multiple access session component 1140 may be configured as or otherwise support a means for obtaining, from the modem processor, an indication of the multiple access session, where the request to establish the connection with the second wireless communication network is indicated in response to the obtained indication of the multiple access session.

In some examples, the configuration manager 1145 may be configured as or otherwise support a means for indicating, to the modem processor, a configuration request based on the indicated request to establish the connection with the second wireless communication network, the indicated configuration request including one or more internet protocol addresses associated with the second wireless communication network. In some examples, the connection manager 1130 may be configured as or otherwise support a means for obtaining, from the modem processor, a connection status in response to the indicated configuration request.

In some examples, the connection manager 1130 may be configured as or otherwise support a means for obtaining, at the application processor, an indication of the second wireless communication network, where the request to establish the connection with the second wireless communication network is indicated based on the obtained indication of the second wireless network.

In some examples, the request to establish the connection with the second wireless communication network indicates the connection with the second wireless communication network is secondary to a connection with the first wireless communication network.

In some examples, the obtained set of data transmission rules include one or more rules associated with access traffic steering, switching, splitting, or any combination thereof.

In some examples, the obtained set of data transmission rules are associated with a multipath transmission control protocol.

Figure 12:
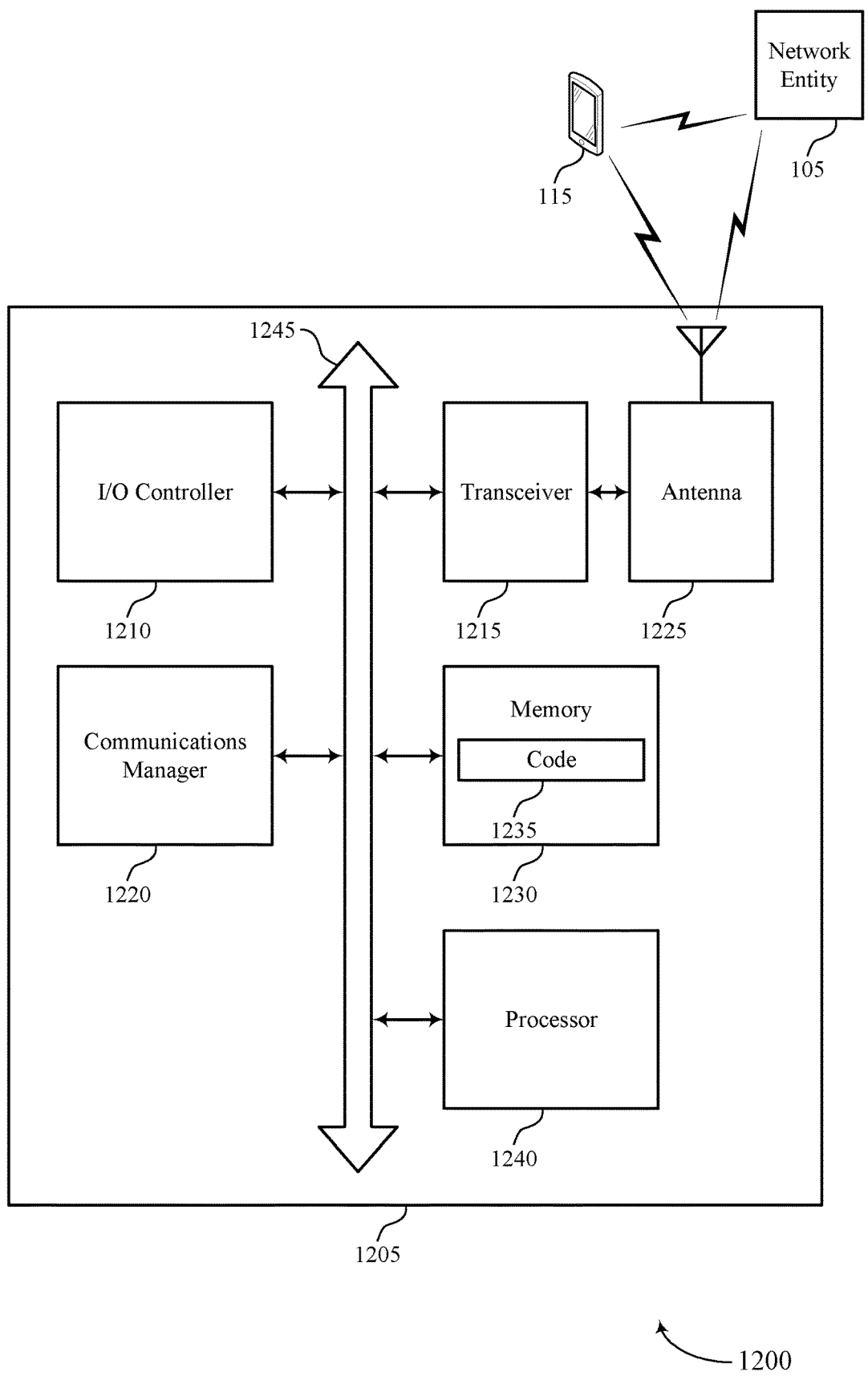
FIG. 12 shows a diagram of a system including a device that supports techniques for data transmission management in accordance with one or more aspects of the present disclosure.

FIG. 12 shows a diagram of a system 1200 including a device 1205 that supports techniques for data transmission management in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for data transmission management). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for indicating, to an application processor and from a modem processor associated with a first wireless communication network, a readiness state for communication via a second wireless communication network based on a route selection policy at the UE. The communications manager 1220 may be configured as or otherwise support a means for obtaining, at the modem processor and based on the indicated readiness state, a request to establish a connection with the second wireless communication network. The communications manager 1220 may be configured as or otherwise support a means for indicating, to the application processor and in response to the obtained request, a set of data transmission rules associated with the first wireless communication network and the second wireless communication network. The communications manager 1220 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

Additionally, or alternatively, the communications manager 1220 may support wireless communication at a UE in accordance with examples as disclosed herein. For example, the communications manager 1220 may be configured as or otherwise support a means for obtaining, at an application processor and from a modem processor associated with a first wireless communication network, an indication of a readiness state for communication via a second wireless communication network based on a route selection policy at the UE. The communications manager 1220 may be configured as or otherwise support a means for indicating, to the modem processor and based on the obtained indication of the readiness state, a request to establish a connection with the second wireless communication network. The communications manager 1220 may be configured as or otherwise support a means for obtaining, at the application processor and from the modem processor, a set of data transmission rules associated with the first wireless communication network and the second wireless communication network. The communications manager 1220 may be configured as or otherwise support a means for communicating with a network entity via a multiple access session in accordance with the indicated set of data transmission rules, the multiple access session including a first access session associated with communication via the first wireless communication network and a second access session associated with the communication via the second wireless communication network.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for data transmission management as described herein, or the processor 1240 and the memory 1230 may be otherwise configured to perform or support such operations.

Figure 13:
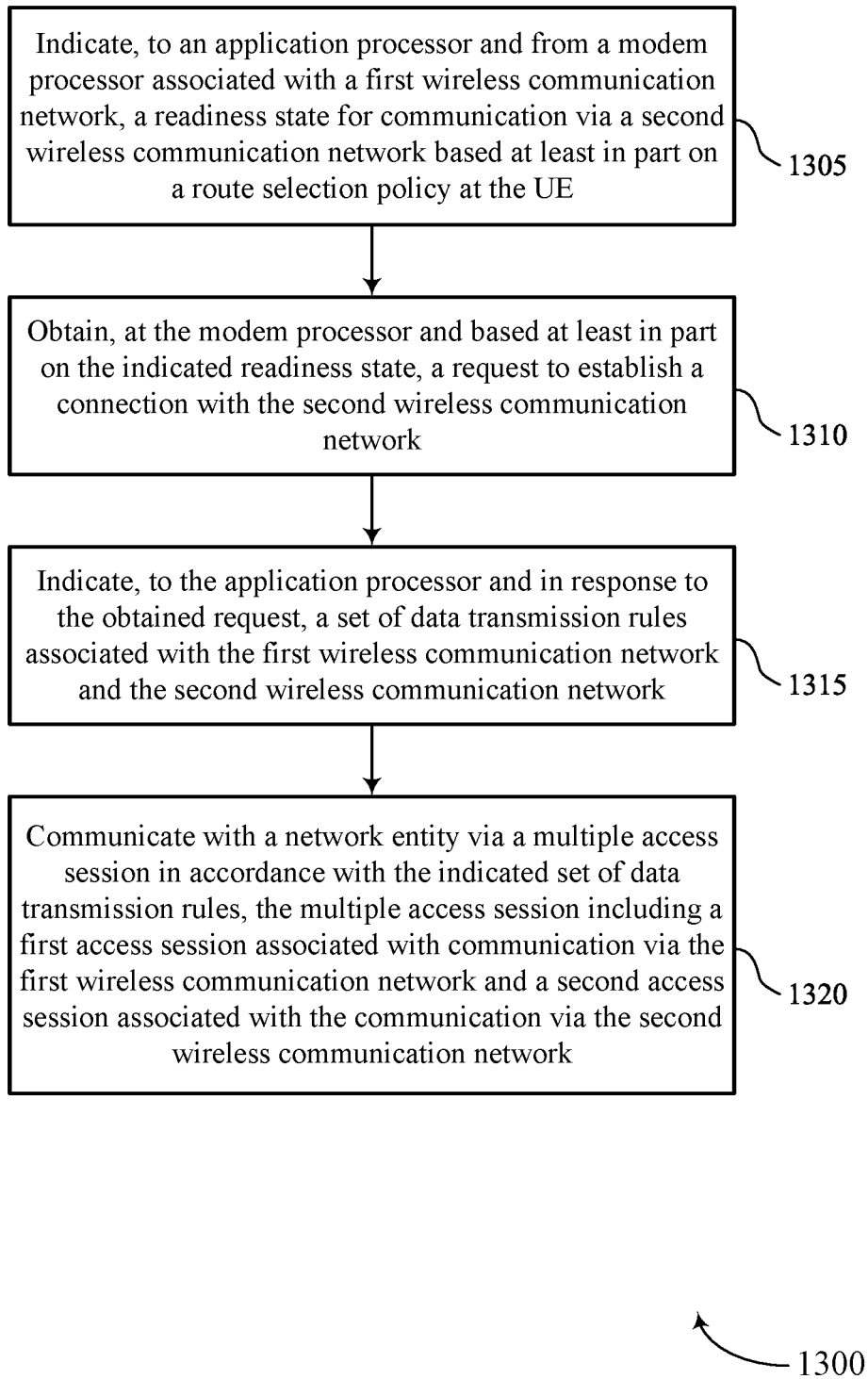
FIGS. 13 and 14 show flowcharts illustrating methods that support techniques for data transmission management in accordance with one or more aspects of the present disclosure.

FIG. 13 shows a flowchart illustrating a method 1300 that supports techniques for data transmission management in accordance with one or more aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include indicating, to an application processor and from a modem processor associated with a first wireless communication network, a readiness state for communication via a second wireless communication network based on a route selection policy at the UE. The operations of 1305 may be performed in accordance with examples as disclosed herein. In some examples, aspects of the operations of 1305 may be performed by a readiness component 1125 as described with reference to FIG. 11.

At 1310, the method may include obtaining, at the modem processor and based on the indicated readiness state, a request to establish a connection with the second wireless communication network. The operations of 1310 may be performed in accordance with examples as disclosed herein. In some examples, aspects of the operations of 1310 may be performed by a connection manager 1130 as described with reference to FIG. 11.

At 1315, the method may include indicating, to the application processor and in response to the obtained request, a set of data transmission rules associated with the first wireless communication network and the second wireless communication network. The operations of 1315 may be performed in accordance with examples as disclosed herein. In some examples, aspects of the operations of 1315 may be performed by a transmission rule component 1135 as described with reference to FIG. 11.

At 1320, the method may include communicating with a network entity via a multiple access session in accordance with the indicated set of data transmission rules, the multiple access session including a first access session associated with communication via the first wireless communication network and a second access session associated with the communication via the second wireless communication network. The operations of 1320 may be performed in accordance with examples as disclosed herein. In some examples, aspects of the operations of 1320 may be performed by a multiple access session component 1140 as described with reference to FIG. 11.

Figure 14:
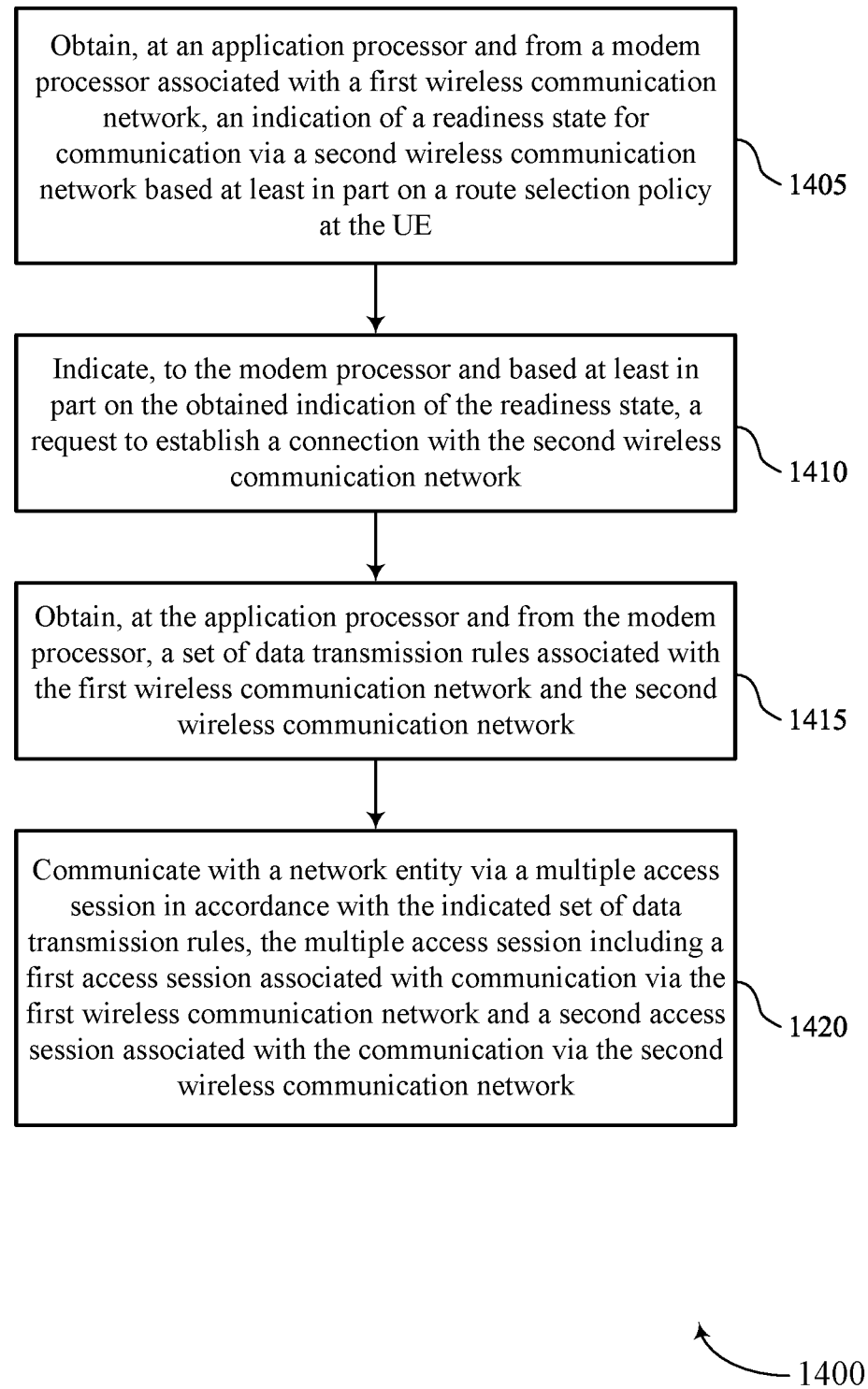

FIG. 14 shows a flowchart illustrating a method 1400 that supports techniques for data transmission management in accordance with one or more aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include obtaining, at an application processor and from a modem processor associated with a first wireless communication network, an indication of a readiness state for communication via a second wireless communication network based on a route selection policy at the UE. The operations of 1405 may be performed in accordance with examples as disclosed herein. In some examples, aspects of the operations of 1405 may be performed by a readiness component 1125 as described with reference to FIG. 11.

At 1410, the method may include indicating, to the modem processor and based on the obtained indication of the readiness state, a request to establish a connection with the second wireless communication network. The operations of 1410 may be performed in accordance with examples as disclosed herein. In some examples, aspects of the operations of 1410 may be performed by a connection manager 1130 as described with reference to FIG. 11.

At 1415, the method may include obtaining, at the application processor and from the modem processor, a set of data transmission rules associated with the first wireless communication network and the second wireless communication network. The operations of 1415 may be performed in accordance with examples as disclosed herein. In some examples, aspects of the operations of 1415 may be performed by a transmission rule component 1135 as described with reference to FIG. 11.

At 1420, the method may include communicating with a network entity via a multiple access session in accordance with the indicated set of data transmission rules, the multiple access session including a first access session associated with communication via the first wireless communication network and a second access session associated with the communication via the second wireless communication network. The operations of 1420 may be performed in accordance with examples as disclosed herein. In some examples, aspects of the operations of 1420 may be performed by a multiple access session component 1140 as described with reference to FIG. 11.

The following provides an overview of aspects of the present disclosure:

Aspect 1: A method for wireless communication at a UE, comprising: indicating, to an application processor and from a modem processor associated with a first wireless communication network, a readiness state for communication via a second wireless communication network based at least in part on a route selection policy at the UE; obtaining, at the modem processor and based at least in part on the indicated readiness state, a request to establish a connection with the second wireless communication network; indicating, to the application processor and in response to the obtained request, a set of data transmission rules associated with the first wireless communication network and the second wireless communication network; and communicating with a network entity via a multiple access session in accordance with the indicated set of data transmission rules, the multiple access session including a first access session associated with communication via the first wireless communication network and a second access session associated with the communication via the second wireless communication network.

Aspect 2: The method of aspect 1, further comprising: indicating, from the modem processor to the application processor, a connection status based at least in part on the obtained request to establish the connection with the second wireless communication network; obtaining, from the application processor and in response to the indicated connection status, a configuration request associated with a security protocol at the modem processor; and indicating a security configuration to the application processor in response to the obtained configuration request, wherein the communicating with the network entity is based at least in part on the indicated security configuration.

Aspect 3: The method of any of aspects 1 through 2, further comprising: indicating, from a first layer of the modem processor to a second layer of the modem processor, a service associated with the second wireless communication network; and obtaining, in response to the indicated service, a registration request associated with a non-access stratum of the first wireless communication network.

Aspect 4: The method of aspect 3, wherein the indicated readiness state comprises an identifier associated with the UE, a payload of the obtained registration request, or both.

Aspect 5: The method of any of aspects 1 through 4, further comprising: indicating the multiple access session to the application processor, wherein the request to establish the connection with the second wireless communication network is obtained in response to the indicated multiple access session.

Aspect 6: The method of any of aspects 1 through 5, further comprising: obtaining, from the application processor, a configuration request based at least in part on the obtained request to establish the connection with the second wireless communication network, the obtained configuration request comprising one or more internet protocol addresses associated with the second wireless communication network; and indicating, from the modem processor to the application processor, a connection status in response to the obtained configuration request.

Aspect 7: The method of any of aspects 1 through 6, further comprising: obtaining, at the modem processor, an indication of the second wireless communication network, wherein the readiness state is indicated based at least in part on the obtained indication.

Aspect 8: The method of aspect 7, wherein the indication of the second wireless communication network is obtained from the application processor.

Aspect 9: The method of any of aspects 1 through 8, wherein the obtained request indicates the connection with the second wireless communication network is secondary to a connection with the first wireless communication network.

Aspect 10: The method of any of aspects 1 through 9, wherein the indicated set of data transmission rules comprise one or more rules associated with access traffic steering, switching, splitting, or any combination thereof.

Aspect 11: The method of any of aspects 1 through 10, wherein the indicated set of data transmission rules are associated with a multipath transmission control protocol.

Aspect 12: A method for wireless communication at a UE, comprising: obtaining, at an application processor and from a modem processor associated with a first wireless communication network, an indication of a readiness state for communication via a second wireless communication network based at least in part on a route selection policy at the UE; indicating, to the modem processor and based at least in part on the obtained indication of the readiness state, a request to establish a connection with the second wireless communication network; obtaining, at the application processor and from the modem processor, a set of data transmission rules associated with the first wireless communication network and the second wireless communication network; and communicating with a network entity via a multiple access session in accordance with the indicated set of data transmission rules, the multiple access session including a first access session associated with communication via the first wireless communication network and a second access session associated with the communication via the second wireless communication network.

Aspect 13: The method of aspect 12, further comprising: obtaining, from the modem processor, a connection status based at least in part on the indicated request to establish the connection with the second wireless communication network; indicating, in response to the indicated connection status, a configuration request associated with a security protocol at the modem processor; and obtaining a security configuration in response to the indicated configuration request, wherein the communicating with the network entity is based at least in part on the obtained security configuration.

Aspect 14: The method of any of aspects 12 through 13, further comprising: indicating the second wireless network to the modem processor, wherein the indication of the readiness state is obtained in response to indicating the second wireless network.

Aspect 15: The method of any of aspects 12 through 14, wherein the obtained indication of the readiness state comprises an identifier associated with the UE, a payload of a registration request associated with a non-access stratum of the first wireless communication network, or both.

Aspect 16: The method of any of aspects 12 through 15, further comprising: obtaining, from the modem processor, an indication of the multiple access session, wherein the request to establish the connection with the second wireless communication network is indicated in response to the obtained indication of the multiple access session.

Aspect 17: The method of any of aspects 12 through 16, further comprising: indicating, to the modem processor, a configuration request based at least in part on the indicated request to establish the connection with the second wireless communication network, the indicated configuration request comprising one or more internet protocol addresses associated with the second wireless communication network; and obtaining, from the modem processor, a connection status in response to the indicated configuration request.

Aspect 18: The method of any of aspects 12 through 17, further comprising: obtaining, at the application processor, an indication of the second wireless communication network, wherein the request to establish the connection with the second wireless communication network is indicated based at least in part on the obtained indication of the second wireless network.

Aspect 19: The method of any of aspects 12 through 18, wherein the request to establish the connection with the second wireless communication network indicates the connection with the second wireless communication network is secondary to a connection with the first wireless communication network.

Aspect 20: The method of any of aspects 12 through 19, wherein the obtained set of data transmission rules comprise one or more rules associated with access traffic steering, switching, splitting, or any combination thereof.

Aspect 21: The method of any of aspects 12 through 20, wherein the obtained set of data transmission rules are associated with a multipath transmission control protocol.

Aspect 22: An apparatus for wireless communication at a UE, comprising a processor; memory coupled with the processor; and instructions stored in the memory and executable by the processor to cause the apparatus to perform a method of any of aspects 1 through 11.

Aspect 23: An apparatus for wireless communication at a UE, comprising at least one means for performing a method of any of aspects 1 through 11.

Aspect 24: A non-transitory computer-readable medium storing code for wireless communication at a UE, the code comprising instructions executable by a processor to perform a method of any of aspects 1 through 11.

Aspect 25: An apparatus for wireless communication at a UE, comprising a processor; memory coupled with the processor; and instructions stored in the memory and executable by the processor to cause the apparatus to perform a method of any of aspects 12 through 21.

Aspect 26: An apparatus for wireless communication at a UE, comprising at least one means for performing a method of any of aspects 12 through 21.

Aspect 27: A non-transitory computer-readable medium storing code for wireless communication at a UE, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    indicating, from a first layer of a modem processor of the UE to a non-access stratum layer of the modem processor, a service associated with a second wireless communication network;
    obtaining, in response to the indicated service, a registration request associated with a non-access stratum of a first wireless communication network;
    indicating, to an application processor of the UE and from the modem processor of the UE, a readiness state of the modem processor for communication via the second wireless communication network based at least in part on a route selection policy at the UE, the indication comprising a non-access stratum payload associated with the registration request, wherein the application processor of the UE controls communications via the first wireless communication network and the modem processor of the UE controls communications via the second wireless communication network;
    obtaining, at the modem processor of the UE and based at least in part on the indicated readiness state of the modem processor, a request to establish a connection with the second wireless communication network;
    indicating, to the application processor of the UE from the modem processor of the UE and in response to the obtained request, a set of data transmission rules associated with the first wireless communication network and the second wireless communication network; and
    communicating with a network entity via a multiple access session in accordance with the indicated set of data transmission rules, the multiple access session including a first access session associated with communication via the modem processor of the UE associated with the first wireless communication network and a second access session associated with the communication via the application processor of the UE associated with the second wireless communication network.

2. The method of claim 1, further comprising:
    indicating, from the modem processor to the application processor, a connection status based at least in part on the obtained request to establish the connection with the second wireless communication network;
    obtaining, from the application processor and in response to the indicated connection status, a configuration request associated with a security protocol at the modem processor; and
    indicating a security configuration to the application processor in response to the obtained configuration request, wherein the communicating with the network entity is based at least in part on the indicated security configuration.

3. The method of claim 1, wherein the readiness state indicated from the modem processor of the UE further comprises an identifier associated with the UE.

4. The method of claim 1, further comprising:
    indicating the multiple access session to the application processor, wherein the request to establish the connection with the second wireless communication network is obtained in response to the indicated multiple access session.

5. The method of claim 1, further comprising:
    obtaining, from the application processor, a configuration request based at least in part on the obtained request to establish the connection with the second wireless communication network, the obtained configuration request comprising one or more internet protocol addresses associated with the second wireless communication network; and
    indicating, from the modem processor to the application processor, a connection status in response to the obtained configuration request.

6. The method of claim 1, further comprising:
    obtaining, at the modem processor, an indication of the second wireless communication network, wherein the readiness state is indicated based at least in part on the obtained indication.

7. The method of claim 6, wherein the indication of the second wireless communication network is obtained from the application processor.

8. The method of claim 1, wherein the obtained request indicates the connection with the second wireless communication network is secondary to a connection with the first wireless communication network.

9. The method of claim 1, wherein the indicated set of data transmission rules comprise one or more rules associated with access traffic steering, switching, splitting, or any combination thereof.

10. The method of claim 1, wherein the indicated set of data transmission rules are associated with a multipath transmission control protocol.

11. A method for wireless communication at a user equipment (UE), comprising:
obtaining, at an application processor of the UE and from a modem processor of the UE, an indication of a readiness state of the modem processor for communication via a second wireless communication network based at least in part on a route selection policy at the UE, the indication comprising a non-access stratum payload associated with a registration request from a non-access stratum layer of the modem processor, wherein the application processor of the UE controls communications via a first wireless communication network and the modem processor of the UE controls communications via the second wireless communication network;
indicating, to the modem processor of the UE and based at least in part on the obtained indication of the readiness state of the modem processor, a request to establish a connection with the second wireless communication network;
obtaining, at the application processor of the UE and from the modem processor of the UE, a set of data transmission rules associated with the first wireless communication network and the second wireless communication network; and
communicating with a network entity via a multiple access session in accordance with the indicated set of data transmission rules, the multiple access session including a first access session associated with communication via the modem processor of the UE associated with the first wireless communication network and a second access session associated with the communication via the application processor of the UE associated with the second wireless communication network.

12. The method of claim 11, further comprising:
obtaining, from the modem processor, a connection status based at least in part on the indicated request to establish the connection with the second wireless communication network;
indicating, in response to the indicated connection status, a configuration request associated with a security protocol at the modem processor; and
obtaining a security configuration in response to the indicated configuration request, wherein the communicating with the network entity is based at least in part on the obtained security configuration.

13. The method of claim 11, further comprising:
indicating the second wireless network to the modem processor, wherein the indication of the readiness state is obtained in response to indicating the second wireless network.

14. The method of claim 11, wherein the indication of the readiness state obtained from the modem processor of the UE further comprises an identifier associated with the UE.

15. The method of claim 11, further comprising:
obtaining, from the modem processor, an indication of the multiple access session, wherein the request to establish the connection with the second wireless communication network is indicated in response to the obtained indication of the multiple access session.

16. The method of claim 11, further comprising:
indicating, to the modem processor, a configuration request based at least in part on the indicated request to establish the connection with the second wireless communication network, the indicated configuration request comprising one or more internet protocol addresses associated with the second wireless communication network; and
obtaining, from the modem processor, a connection status in response to the indicated configuration request.

17. The method of claim 11, further comprising:
obtaining, at the application processor, an indication of the second wireless communication network, wherein the request to establish the connection with the second wireless communication network is indicated based at least in part on the obtained indication of the second wireless network.

18. The method of claim 11, wherein the request to establish the connection with the second wireless communication network indicates the connection with the second wireless communication network is secondary to a connection with the first wireless communication network.

19. The method of claim 11, wherein the obtained set of data transmission rules comprise one or more rules associated with access traffic steering, switching, splitting, or any combination thereof.

20. The method of claim 11, wherein the obtained set of data transmission rules are associated with a multipath transmission control protocol.

21. An apparatus for wireless communication at a user equipment (UE), comprising:
a processor;
memory coupled with the processor; and
instructions stored in the memory and executable by the processor to cause the apparatus to:
indicate, from a first layer of a modem processor of the UE to a non-access stratum layer of the modem processor, a service associated with a second wireless communication network;
obtain, in response to the indicated service, a registration request associated with a non-access stratum of a first wireless communication network;
indicate, to an application processor of the UE and from the modem processor of the UE, a readiness state of the modem processor for communication via the second wireless communication network based at least in part on a route selection policy at the UE, the indication comprising a non-access stratum payload associated with the registration request, wherein the application processor of the UE controls communications via the first wireless communication network and the modem processor of the UE controls communications via the second wireless communication network;
obtain, at the modem processor of the UE and based at least in part on the indicated readiness state of the modem processor, a request to establish a connection with the second wireless communication network;

indicate, to the application processor of the UE from the modem processor of the UE and in response to the obtained request, a set of data transmission rules associated with the first wireless communication network and the second wireless communication network; and communicate with a network entity via a multiple access session in accordance with the indicated set of data transmission rules, the multiple access session including a first access session associated with communication via the modem processor of the UE associated with the first wireless communication network and a second access session associated with the communication via the application processor of the UE associated with the second wireless communication network.

22. The apparatus of claim 21, wherein the instructions are further executable by the processor to cause the apparatus to:

indicate, from the modem processor to the application processor, a connection status based at least in part on the obtained request to establish the connection with the second wireless communication network;

obtain, from the application processor and in response to the indicated connection status, a configuration request associated with a security protocol at the modem processor; and indicate a security configuration to the application processor in response to the obtained configuration request, wherein the communicating with the network entity is based at least in part on the indicated security configuration.

23. The apparatus of claim 21, wherein the readiness state indicated from the modem processor of the UE further comprises an identifier associated with the UE.

24. The apparatus of claim 21, wherein the instructions are further executable by the processor to cause the apparatus to:

obtain, from the application processor, a configuration request based at least in part on the obtained request to establish the connection with the second wireless communication network, the obtained configuration request comprising one or more internet protocol addresses associated with the second wireless communication network; and indicate, from the modem processor to the application processor, a connection status in response to the obtained configuration request.

25. An apparatus for wireless communication at a user equipment (UE), comprising:

a processor;

memory coupled with the processor; and instructions stored in the memory and executable by the processor to cause the apparatus to:

obtain, at an application processor of the UE and from a modem processor of the UE, an indication of a readiness state of the modem processor for communication via a second wireless communication network based at least in part on a route selection policy at the UE, the indication comprising a non-access stratum payload associated with a registration request from a non-access stratum layer of the modem processor, wherein the application processor of the UE controls communications via a first wireless communication network and the modem processor of the UE controls communications via the second wireless communication network;

indicate, to the modem processor of the UE and based at least in part on the obtained indication of the readiness state of the modem processor, a request to establish a connection with the second wireless communication network;

obtain, at the application processor of the UE and from the modem processor of the UE, a set of data transmission rules associated with the first wireless communication network and the second wireless communication network; and communicate with a network entity via a multiple access session in accordance with the indicated set of data transmission rules, the multiple access session including a first access session associated with communication via the modem processor of the UE associated with the first wireless communication network and a second access session associated with the communication via the application processor of the UE associated with the second wireless communication network.

26. The apparatus of claim 25, wherein the instructions are further executable by the processor to cause the apparatus to:

obtain, from the modem processor, a connection status based at least in part on the indicated request to establish the connection with the second wireless communication network;

indicate, in response to the indicated connection status, a configuration request associated with a security protocol at the modem processor; and obtain a security configuration in response to the indicated configuration request, wherein the communicating with the network entity is based at least in part on the obtained security configuration.

27. The apparatus of claim 25, wherein the instructions are further executable by the processor to cause the apparatus to:

indicate the second wireless network to the modem processor, wherein the indication of the readiness state is obtained in response to indicating the second wireless network.

28. The apparatus of claim 25, wherein the indication of the readiness state obtained from the modem processor of the UE further comprises an identifier associated with the UE.

* * * * *